United States Patent
Sakuma et al.

(10) Patent No.: US 11,187,870 B2
(45) Date of Patent: Nov. 30, 2021

(54) LENS APPARATUS, IMAGE PICKUP APPARATUS, PROCESSING APPARATUS, AND CAMERA APPARATUS

(71) Applicant: CANON KABUSHIKI KAISHA, Tokyo (JP)

(72) Inventors: Koichi Sakuma, Yokohama (JP); Tomoyuki Nakamura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 172 days.

(21) Appl. No.: 16/562,636

(22) Filed: Sep. 6, 2019

(65) Prior Publication Data

US 2020/0081222 A1 Mar. 12, 2020

(30) Foreign Application Priority Data

Sep. 11, 2018 (JP) .............................. JP2018-169309

(51) Int. Cl.
*G02B 7/14* (2021.01)
*G02B 15/20* (2006.01)

(52) U.S. Cl.
CPC ............... *G02B 7/14* (2013.01); *G02B 15/20* (2013.01)

(58) Field of Classification Search
CPC .......... G02B 7/14; G02B 7/102; G02B 13/16; G02B 13/32; G03B 13/32; G03B 7/20; H04N 5/238; H04N 5/2254; G06T 5/004; G06T 5/00
USPC ........................................................ 359/683
See application file for complete search history.

(56) References Cited

U.S. PATENT DOCUMENTS

| 7,057,827 | B2 | 6/2006 | Wakazono |
| 7,570,837 | B2 | 8/2009 | Hori |
| 7,580,199 | B2 | 8/2009 | Yakita |
| 8,508,655 | B2 | 8/2013 | Suto |

(Continued)

FOREIGN PATENT DOCUMENTS

| CN | 105572864 A | 5/2016 |
| CN | 106896525 A | 6/2017 |

(Continued)

OTHER PUBLICATIONS

Extended European Search Report issued in European Appln. No. 19195997.2 dated Jan. 31, 2020.

(Continued)

*Primary Examiner* — Kristina M Deherrera
(74) *Attorney, Agent, or Firm* — Rossi, Kimms & McDowell LLP

(57) ABSTRACT

Provided is a lens apparatus attachable and detachable to a camera apparatus including: a memory storing information for light amount compensation for image data obtained by pickup of an image formed by the lens apparatus; and a communication device configured to transmit the information to an external apparatus, the information including a coefficient of a polynomial having an n-th order with respect to an image height, "n" being a non-negative integer, the coefficient corresponding to one of a plurality of focal lengths, the plurality of focal lengths including a focal length "f", which satisfies a conditional expression: $0.9 < f/ft/(Fnw/Fnt) < 4$, where Fnw represents an effective f-number at a wide angle end, Fnt represents an effective f-number at a telephoto end, and "ft" represents a focal length at the telephoto end.

15 Claims, 12 Drawing Sheets

(56) References Cited

U.S. PATENT DOCUMENTS

2013/0016274 A1   1/2013   Matsuo
2015/0181128 A1   6/2015   Kaku

FOREIGN PATENT DOCUMENTS

| JP | H11164194 A | 6/1999 |
|----|-------------|--------|
| JP | H11250238 A | 9/1999 |
| JP | 2005057605 A | 3/2005 |
| JP | 2005217504 A | 8/2005 |
| JP | 2005292524 A | 10/2005 |
| JP | 2006303709 A | 11/2006 |
| JP | 2008096907 A | 4/2008 |
| JP | 2009036844 A | 2/2009 |
| JP | 2013042424 A | 2/2013 |
| JP | 2014153625 A | 8/2014 |
| JP | 2020042157 A | 3/2020 |
| WO | 2014115274 A1 | 7/2014 |

OTHER PUBLICATIONS

Office Action issued in Chinese Appln. No. 201910858827.9 dated Apr. 9, 2021. English translation provided.
English translation of Office Action issued in Japanese Appln. No. 2018-169309 dated Jan. 5, 2021, previously cited in IDS filed Jan. 22, 2021.

LENS APPARATUS, IMAGE PICKUP APPARATUS, PROCESSING APPARATUS, AND CAMERA APPARATUS

BACKGROUND OF THE INVENTION

Field of the Invention

The present invention relates to a lens apparatus, an image pickup apparatus, a processing apparatus, and a camera apparatus.

Description of the Related Art

In most of cameras for broadcasting (television cameras), cameras for movies, cameras for photographs, video cameras, and similar cameras, the light amount is smaller in a peripheral portion of the image plane than in a central portion of the image plane. The ratio of the light amount in the peripheral portion to the light amount in the central portion changes as an optical system is operated by, for example, zooming, focusing, or the operation of a stop. A change of the ratio is caused by one or both of a change of the light amount in the central portion and a change of the light amount in the peripheral portion. A main cause is vignetting of a part of an axial light flux and an off-axis light flux that occurs as the optical system is operated in the manner described above on the outer side of a lens, the stop, or a similar optical member. This is improved by increasing the effective diameter of the lens or a similar member so as to cover all paths of the axial light flux and the off-axis light flux that change as the optical system is operated. The increased effective diameter, however, is adverse to reduction in the size and weight of a lens apparatus. In addition, the increased effective diameter increases spherical aberration, field curvature, and other types of aberration, which makes correction difficult. A method has therefore been known in which a drop in peripheral light amount is compensated by image processing instead of optical correction.

In Japanese Patent Application Laid-Open No. H11-164194, there is disclosed a method in which a drop in peripheral light amount is compensated by approximating the image height with a second-order polynomial, a third-order polynomial, or a fourth-order polynomial.

In Japanese Patent Application Laid-Open No. 2005-217504, there is disclosed a method in which the peripheral light amount is compensated based on the focal length of a lens apparatus.

In Japanese Patent Application Laid-Open No. 2008-96907, there is disclosed a lens apparatus, which is configured to hold information about the correction of chromatic aberration of magnification and information about the correction of a drop in peripheral light amount, and transmit the information to an image pickup apparatus in response to a command from the image pickup apparatus.

The peripheral light amount compensation described above, which uses image processing, requires real-time processing in the case of the image pickup of a moving image. The amount of information communication between the lens apparatus and a camera apparatus, and a data capacity to be used for image processing are accordingly limited. For instance, while the peripheral light amount changes with zooming, peripheral light amount compensation data held by the lens apparatus is discrete infinite data in terms of the zoom state. Interpolation processing for interpolating the compensation data is accordingly executed for a zoom state between discrete zoom states. Embodiments of the interpolation processing include substitution with compensation data of a zoom state closest to the current zoom state (nearest-neighbor interpolation), linear interpolation, and interpolation with an n-th-order polynomial. In any of those types of interpolation processing, satisfactory light amount compensation is possible when zoom states are divided at a small enough division pitch. However, the division pitch is not small enough because of the limited data capacity described above, and overcompensation or undercompensation due to an interpolation error may accordingly occur around a zoom state in which the peripheral light amount fluctuates steeply.

The overcompensation or undercompensation due to an interpolation error described above is considered in none of Japanese Patent Application Laid-Open No. H11-164194, Japanese Patent Application Laid-Open No. 2005-217504, and Japanese Patent Application Laid-Open No. 2008-96907.

SUMMARY OF THE INVENTION

An aspect of embodiments provides, for example, a lens apparatus beneficial in light amount compensation for image data obtained by pickup of an image formed thereby.

According to at least one embodiment of the present invention, the disclosure of the embodiments provides a lens apparatus attachable and detachable to a camera apparatus, the lens apparatus including: a memory storing information for light amount compensation for image data obtained by pickup of an image formed by the lens apparatus; and a communication device configured to transmit the information to an external apparatus, in which the information includes a coefficient of a polynomial having an n-th order with respect to an image height, n being a non-negative integer, the coefficient corresponding to one of a plurality of focal lengths, and the plurality of focal lengths includes a focal length f, that satisfies a conditional expression:

$$0.9 < f/ft/(Fnw/Fnt) < 4,$$

where Fnw represents an effective f-number at a wide angle end, Fnt represents an effective f-number at a telephoto end, and ft represents a focal length at the telephoto end.

Further features of the present invention will become apparent from the following description of exemplary embodiments with reference to the attached drawings.

DESCRIPTION OF THE EMBODIMENTS

Now, exemplary embodiments of the present invention are described in detail based on the accompanying drawings.

In each lens cross-sectional view, the left side is an object side (a front side) and an image pickup optical system side, and the right side is an image side (a rear side).

Embodiment

Figure 1:
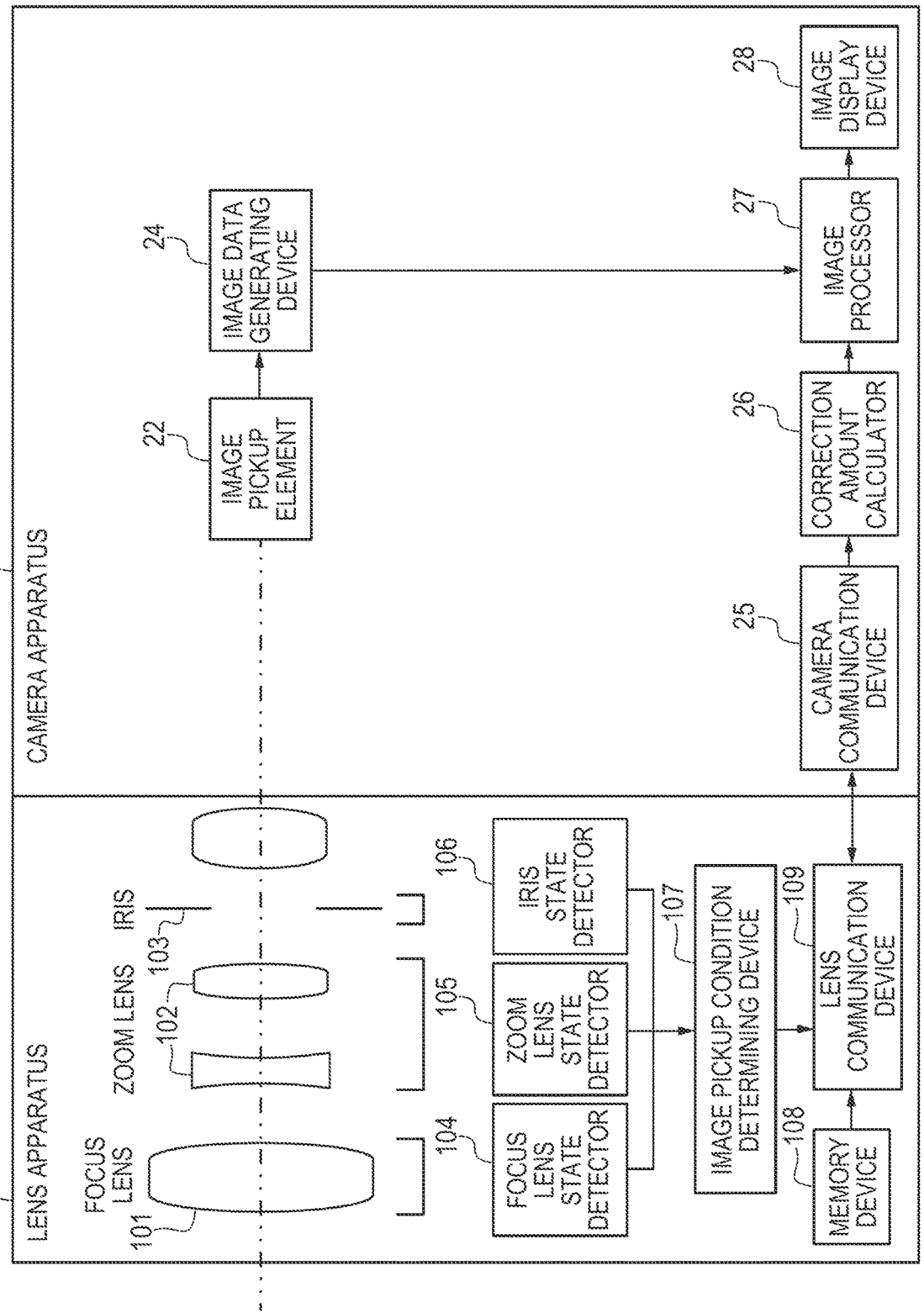
FIG. 1 is a block diagram of an image pickup apparatus according to Embodiment of the present invention.

FIG. 1 is a block diagram of an image pickup system including a lens apparatus and a camera apparatus according to Embodiment of the present invention. In FIG. 1, a lens apparatus (a lens detection and control apparatus and an optical system) 10 is a lens apparatus including an optical member that is movable in image pickup. A camera apparatus 20 is an image pickup apparatus configured to pick up an image, and is connected to the lens apparatus 10.

A focus lens unit 101 is a focus lens unit that is a lens apparatus movable during focusing in image pickup. Although the focus lens unit in FIG. 1 is illustrated in a schematic diagram, the focus lens unit may have a floating focus function, which allows a plurality of units to move independently.

A zoom lens 102 is a lens apparatus configured to move for zooming in image pickup. Although the zoom lens 102 in FIG. 1 is illustrated in a schematic diagram, the zoom lens 102 may include three or more lens apparatus movable during zooming.

An iris 103 is an iris that is variable in aperture size by a user's operation or zooming in image pickup, and that has the function of a light amount stop.

The focus lens unit, the zoom lens unit, and the iris are illustrated in the order stated in a block diagram of the lens apparatus 10. However, the order in which the lens units having different functions are arranged is not limited to the order illustrated in FIG. 1.

A focus lens state detector 104 is a detector configured to detect the state of the focus lens unit, and detects, for example, the position of the focus lens unit. When the focus lens unit consists of a plurality of units, the focus lens state detector 104 may detect the position of only one of the units, or the position of each of the units. A zoom lens state detector 105 is a detector configured to detect the state of a unit configured to move to change magnification during zooming, and detects, for example, the position of the zoom lens unit. The zoom lens unit generally consists of two or more lens units, and the zoom lens state detector 105 may detect the position of only one of the lens units, or the position of each of the lens units that are constituent units. An iris state detector 106 is configured to detect, for example, information about the aperture size of the iris. The iris state detector 106 may use, as a detection value, the value of an f-number because the f-number can be calculated from the information about the aperture size of the iris, or may use an effective f-number as a detection value.

An image pickup condition determining device 107 is configured to determine image pickup conditions of the lens apparatus 10 from detection results of the focus lens state detector 104, the zoom lens state detector 105, and the iris state detector 106. The image pickup conditions are, for example, values indicating the focus lens state, the zoom lens state, and the iris state that are each normalized in a range of movement.

A detector configured to detect the retraction or insertion state of an extender may be added. In this case, the result of detecting the extender retraction/insertion state is used in addition to the detection results of the focus lens state detector 104, the zoom lens state detector 105, and the iris state detector 106 by the image pickup condition determining device 107 to determine image pickup conditions of the lens apparatus 10.

For a zoom lens that includes an image stabilizing lens unit (not shown), a detector configured to detect the state of the image stabilizing lens unit may be added. In this case, the detector detects, for example, the amount of displacement from an optical axis of the image stabilizing lens unit, and the detected amount of displacement is used in addition to the detection results of the detectors described above by the image pickup condition determining device 107 to determine image pickup conditions of the lens apparatus 10. A relationship between the amount of displacement from the optical axis of the image stabilizing lens unit and an optical axis deviation amount on the image plane may be provided to perform correction covering asymmetry in peripheral light amount that is caused by optical axis deviation in image stabilization.

A memory device 108 is a data holder configured to hold optical correction data, and is, for example, a flash ROM or a similar non-volatile memory. The optical correction data is data determined from optical characteristics of the lens apparatus 10, and is described later in detail.

A lens communication device 109 is a communication device (output device) configured to hold communication to and from the camera apparatus 20. The lens communication device 109 is configured in a CPU inside the lens apparatus 10.

An image pickup element 22 is an image pickup element for picking up an image by receiving an optical image that is formed in the lens apparatus 10, and is, for example, a CMOS image sensor. An image data generating device 24 is configured to generate image data.

A camera communication device 25 is a communication device configured to hold communication to and from the lens apparatus 10. A correction amount calculator 26 is configured to calculate a correction amount of image data from the optical correction data and the image pickup conditions. An image processor 27 is configured to perform image processing on a picked up image.

The image data generating device 24, the camera communication unit 25, the correction amount calculator 26, and the image processor 27 are configured in, for example, a CPU inside the camera apparatus 20.

An image display device 28 is a device configured to display an image picked up by the camera apparatus 20 and converted from image data, and is, for example, a liquid crystal monitor.

The flow of processing of outputting an optical image that has been formed by the lens apparatus 10 as an image corrected in light amount is as follows:

A picked up image provided by the lens apparatus 10 is formed on the image pickup element 22, which then converts the image into electric signals by photoelectric conversion. The electric signals are output as pre-optical correction image data from the image data generating device 24 to the image processor 27.

The image processor 27 performs image processing on the pre-optical correction image data, based on a light amount correction amount Dc, which is calculated by the correction amount calculator 26, and the processed data is output to the image display device 28 as post-optical correction image data. A corrected image that has been compensated for a drop in peripheral light amount due to optical characteristics of the lens apparatus 10 is thus displayed on the image display device 28.

Figure 2:
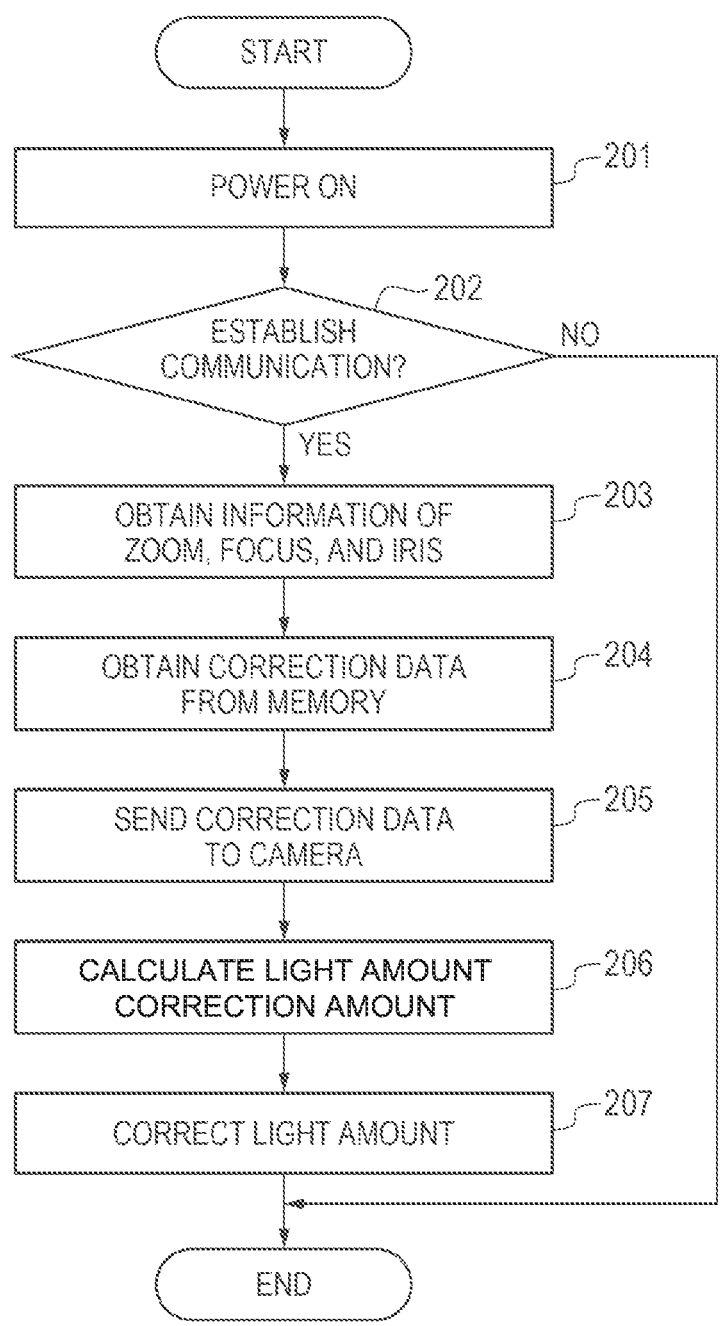
FIG. 2 is a flow chart of optical correction processing in Embodiment of the present invention.

An example of a series of processing steps executed by the camera apparatus 20 to calculate the light amount correction amount Dc with the correction amount calculator 26 is described next with reference to FIG. 2.

When the lens apparatus 10 and the camera apparatus 20 are connected and the camera apparatus 20 is powered on (Step S201), operation of the lens apparatus according to Embodiment is started. The processing shifts from Step S201 to Step S202, in which whether communication to and from the camera apparatus has been established is checked.

When the camera apparatus 20 fails to hold communication to and from the lens apparatus, the processing is ended and steps of the light amount correction processing that are subsequent to Step S202 are not executed. When the camera apparatus 20 is successful in holding communication to and from the lens apparatus, the processing shifts from Step S202 to Step S203, in which the lens apparatus obtains information about the zoom lens, the focus lens and the iris (Step S203), and image pickup conditions are determined. Information suitable for the image pickup conditions is then obtained from an optical correction table (Step S204). Communication to and from the camera communication device 25 is held via the lens communication device 109 to transmit correction data and the image pickup conditions (Step S205).

The optical correction table is information about a plurality of combinations of information about the focus lens state, information about the zoom lens state, information about the iris state, and an image height direction correction coefficient An(Z, F, I). The information about the iris state may be substituted with an f-number or an effective f-number in an iris state of interest. The following is a description of the optical correction table.

A zoom state Z, a focus state F, and an iris state I are stored in the optical correction table. Data held in the optical correction table is only discrete division points for the zoom state, the focus state, and the iris state in order to reduce the amount of data communicated between the lens side and the camera side. A light amount correction amount at an image height "h" in a specific zoom state Z, a specific focus state F, and a specific iris state I is denoted by Dc(Z, F, I, h), and is expressed by an n-th-order equation (n is a non-negative integer) with respect to the image height "h" as follows:

$$Dc(Z,F,I,h)=An(Z,F,I) \times h^n + An-1(Z,F,I) \times h^{(n-1)} + \ldots + A_0(Z,F,I)$$

The optical correction table thus has no discrete division points in the image height direction, and coefficients An(Z, F, I), An−1(Z, F, I) ... A0(Z, F, I) of an n-th-order polynomial are stored for the image height direction.

The processing shifts to Step S206, in which a light amount correction amount suitable for the current zoom state, focus state, and iris state is calculated from the stored zoom state information, focus state information, and iris state information, which are discrete data. When the current zoom state, focus state, and iris state differ from discrete positions stored in the optical correction table, the light amount correction amount is calculated by interpolation processing. The method of interpolation processing may be, for example, linear interpolation. A method other than linear interpolation may be used for the interpolation processing, for example, a method in which correction data of the closest point out of zoom positions, focus positions, and iris positions stored in the optical correction table is applied.

The processing shifts to Step S207, in which the light amount is corrected by the calculated correction amount.

Light amount correction is performed on a picked up image of the lens apparatus 10 in the manner described above.

In the example described here, relevant correction data of the optical correction table and the image pickup conditions are transmitted from the lens side to the camera apparatus side in Step S205. The optical correction table may be held on the camera apparatus side in advance, so that the image pickup conditions alone are transmitted from the lens side to the camera apparatus side.

Light amount correction is described next.

Figure 3:
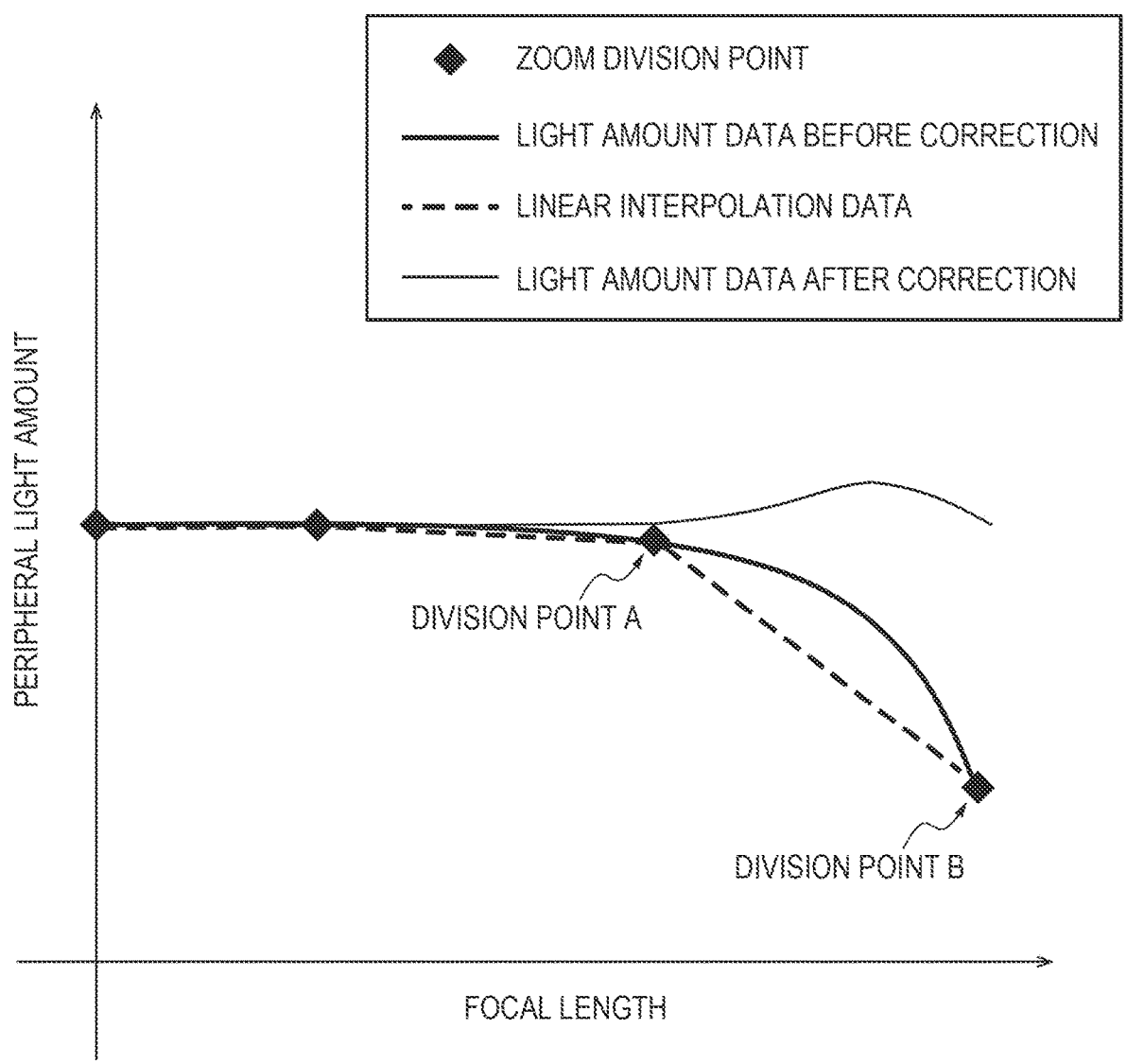
FIG. 3 is a conceptual graph of peripheral light amount correction.

The correction of a change in light amount during zooming is described as an embodiment. FIG. 3 is a graph for showing a relationship between the light amount during zooming, zoom division points, linear interpolation data, and the light amount after correction, which is an optical characteristic of the lens apparatus 10. Light amount correction is implemented by multiplying light amount data by inverse numbers of values of the dotted line, which represents linear interpolation data in FIG. 3. In a section of FIG. 3 between a division point A and a division point B, where a change in light amount during zooming is steep, a gap between the light amount and the linear interpolation data is wide, and the light amount after correction is over-corrected. Satisfactory light amount correction is thus not accomplished when the number of zoom division points is insufficient around a zoom state in which the light amount changes steeply. The correction of a change in light amount during zooming discussed as an embodiment applies to a change in light amount during focusing and a change in light amount during a change in iris diameter as well.

In some lenses for moving images, the light amount in a central portion of the image plane drops during zooming. A change in peripheral light amount due to the light amount drop in the central portion of the image plane is particularly large in a lens having a large focal length range in which a light amount equal to the one at a wide angle end is maintained, for example, a lens for broadcasting. This type of lens has a characteristic in that the drop in central light amount starts increasing at a specific focal length, and the ratio of the central light amount and the peripheral light amount changes accordingly significantly. This means that light amount correction error expands unless an appropriate light amount correction point is chosen as the f-number changes with zooming.

Herein, correction of the light amount made at each image height from a central image height (an image center or image height zero) to a peripheral image height so as to reduce the difference from the light amount at the central image height at each focal length, irrespective of whether the light amount at the central image height changes in relation to the focal length, is defined as light amount correction. Light amount correction that involves correction of the light amount at the central image height made at each focal length so as to reduce the difference between the light amount at the central image height, which changes in relation to the focal length, and the light amount at the wide angle end, and correction of the light amount made at each image height so as to reduce the difference from the corrected light amount at the central image height, is defined as light amount correction including center correction.

A configuration of an interchangeable lens according to at least one embodiment of the present invention is described next.

Figure 4:
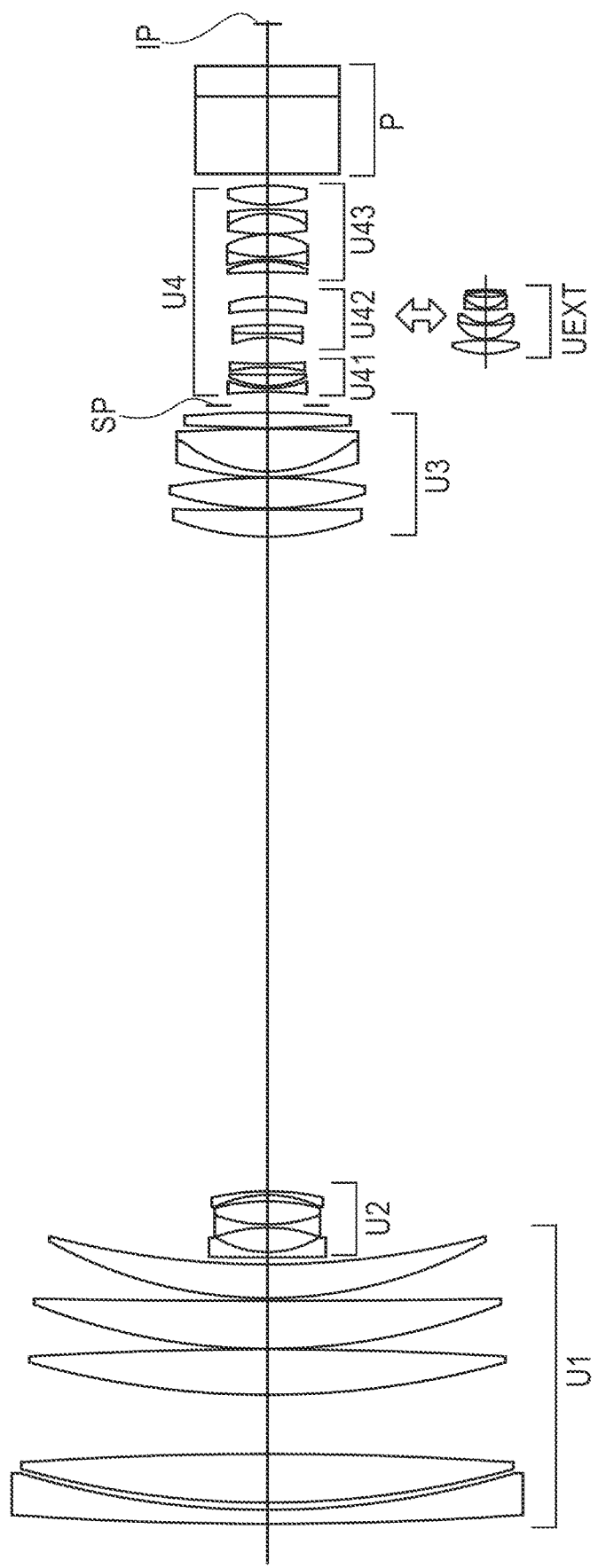
FIG. 4 is a cross-sectional view of a zoom lens of Embodiment.

FIG. 4 is a cross-sectional view of an interchangeable lens of Embodiment of the present invention when focus is at infinity at a wide-angle end.

In the interchangeable lens according to Embodiment of the present invention, a first lens unit U1 having a positive refractive power is configured not to move for zooming. A part of the first lens unit U1 is configured to move toward an object side during focusing from infinity to a close distance side. A second lens unit U2 having a negative refractive power is configured to move toward an image side during zooming from the wide-angle end (short focal length end) to a telephoto end (long focal length end). A third lens unit U3 having a positive refractive power is configured to move in conjunction with the second lens unit U2 to correct an image plane variation accompanying zooming. An aperture stop is denoted by SP. A fourth lens unit U4 having a positive refractive power consists of, in order from the object side, a first lens sub-unit, a second lens sub-unit, which is insertable into and removable from an optical path, and a third lens sub-unit having a positive refractive power. A focal length range of an entire system of the interchangeable lens can be shifted toward a long focal length side through retraction of the second lens sub-unit of a relay lens unit in FIG. 4 from the optical path, and insertion of an extender lens unit into the optical path between the first lens sub-unit and the third lens sub-unit. The fourth lens unit U4 is configured not to move mainly for zooming, but may be fixed during zooming or have a function of finely driving an entirety or a part of the fourth lens unit U4 accompanying driving of another lens unit or the stop. An image plane IP corresponds to an image pickup surface of a solid-state image pickup element (photoelectric transducer).

Next, a configuration of each lens unit of Embodiment is described. The lens configuration is described in order from the object side.

The first lens unit U1 consists of a total of five lenses of a negative lens, a positive lens, a positive lens, a positive lens, and a positive lens. Three positive lenses closest to the image side are configured to move during focusing. The second lens unit U2 consists of one negative lens, a cemented lens of a negative lens and a positive lens, and a negative lens. The third lens unit U3 consists of a positive lens, a positive lens, a cemented lens of a negative lens and a positive lens, and a positive lens. A first lens sub-unit U41 consists of a negative lens, a positive lens, and a negative lens. A second lens sub-unit U42 consists of a cemented lens of a negative lens and a positive lens, and a positive lens. A third lens sub-unit U43 consists of a positive lens, a cemented lens of a negative lens and a positive lens, a cemented lens of a positive lens and a negative lens, and a positive lens.

Figure 5:
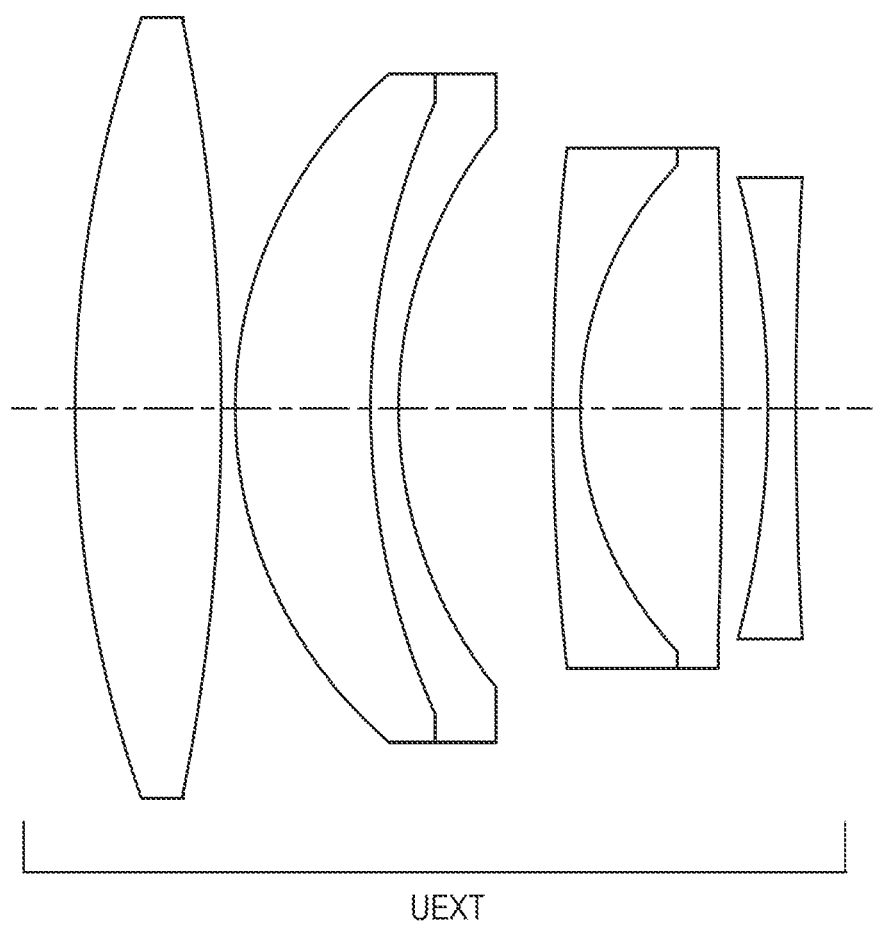
FIG. 5 is a cross-sectional view of an extender lens unit of the zoom lens of Embodiment.

FIG. 5 is a cross-sectional view of an extender lens unit UEXT. The insertion of the extender lens unit UEXT into the optical path in place of the second lens sub-unit shifts the focal length range of the entire interchangeable lens to a range twice wider than when the second lens sub-unit is inserted. The extender lens unit UEXT consists of a biconvex positive lens, a cemented lens of a positive meniscus lens having a convex surface facing the object side and a negative meniscus lens having a convex surface facing the object side, a cemented lens of a negative meniscus lens having a convex surface facing the object side and a biconvex positive lens, and a biconcave negative lens.

The interchangeable lens of the present invention has data for light amount correction as correction data at division points of the focal length. There is at least one division point in the range of a focal length "f", which satisfies the following conditional expression:

$$0.9 < f/ft/(Fnw/Fnt) < 4 \tag{1},$$

where Fnw represents an effective f-number at the wide angle end, Fnt represents an effective f-number at the telephoto end, and "ft" represents the focal length at the telephoto end.

The conditional expression (1) defines the presence of a zoom division point near a point at which the peripheral light amount fluctuates steeply as a characteristic of zoom lenses for moving images and zoom lenses for broadcasting, in particular. When there is no zoom division point in a range that satisfies the conditional expression (1), an error in light amount correction value increases around a focal length at which the peripheral light amount fluctuates steeply, and marked overcorrection or undercorrection is observed in the corrected peripheral light amount.

As a further embodiment mode of the present invention, it is desired that a conditional expression (2) defining the focal length range and the number of zoom division data points be satisfied.

$$0.01 < ((F_{n(f+\Delta f)} - F_{nf}) - (F_{nf} - F_{n(f-\Delta f)})) / N_{(f\pm\Delta f)} < 0.2 \tag{2}$$

In the conditional expression (2), $\Delta f$ is expressed by the following expression:

$$\Delta f = 0.2 \times (ft - fw) \tag{3},$$

where "fw" represents the focal length at the wide angle end, and "ft" represents the focal length at the telephoto end. Further, in the conditional expression (2), N(f±Δf) represents the number of zoom division points in the range of a focal length section of (f–Δf) or more and (f+Δf) or less, and $F_{nf}$ represents an effective f-number at any value of the focal length "f".

The conditional expression (2) is satisfied in a range that satisfies the following conditional expression:

$$0.5 < (F_{n(f+\Delta f)} - F_{nf}) - (F_{nf} - F_{n(f-\Delta f)}) < 5.0 \tag{4}.$$

The conditional expression (2) defines that an appropriate number of data points be provided in a focal length range in which the numerator, namely, the fluctuation rate of Fno due to zooming operation, is high. The expression (3) defines one side of the focal length range defined by the conditional expression (2) as 20% of a focal length difference between the wide angle end and the telephoto end. The conditional expression (4) defines a range in which Fno changes by a certain amount or more out of a focal length range defined based on the expression (3). When an upper limit of the conditional expression (2) is exceeded, the number of zoom division points in a focal length range in which Fno changes significantly becomes insufficient, with the result that the correction error expands to an excessively large amount in the correction of the peripheral light amount. When a lower limit of the conditional expression (2) is not reached, the number of zoom division points becomes excessive, with the result that a data capacity for light amount correction increases too much. When a lower limit of the conditional expression (4) is not reached, a range in which the fluctuation rate of Fno is low is defined, and the number of data points defined by the conditional expression (2) accordingly becomes excessive. When an upper limit of the conditional expression (4) is exceeded, the number of data points defined by the conditional expression (2) becomes excessively small.

As a further embodiment mode of the present invention, it is desired that data corresponding to each parameter of the zoom state, the focus state, the iris state, and the image height be included as data for light amount correction.

As a further embodiment mode of the present invention, it is desired that the held correction data be expressed by a conditional expression (5), which is a third-order expression with respect to the image height "h" as given below:

$$Dc = C3 \times h^3 + C2 \times h^2 + C1 \times h + C0 \tag{5},$$

where Dc represents the data for light amount correction.

In the conditional expression (5), C3, C2, C1, and C0 represent third-order, second-order, first-order, and 0-th-order coefficients, respectively, of the image height "h". Values of the coefficients C3, C2, C1, and C0 (C0 is a constant term) depend on at least the zoom state, the focus state, and the iris state. With correction data in the image height direction defined by the third-order expression that is expressed as the conditional expression (5), only data of each order is required to be held as the number of pieces of correction data under a specific zoom condition, focus condition, and iris condition, for example. This means that the capacity of held data can be reduced.

As a further embodiment mode of the present invention, it is desired that the coefficients C3, C2, C1, and C0 defined by the conditional expression (5) vary depending on three types of information: information about the zoom lens, information about the focus lens, and information about the stop. In particular, satisfactory light amount correction is accomplished while minimizing data capacity, by using only elements that significantly affect a change in peripheral light amount as variables.

As a further embodiment mode of the present invention, it is desired that the coefficient C3 and the coefficient C2, which are defined by the conditional expression (5), satisfy a conditional expression (6) given below:

$$-0.1 < C2 + 6 \times C3 < 0.3 \tag{6}.$$

The conditional expression (6) defines a relationship of coefficients suitable for light amount correction in the image height direction. When an upper limit of the conditional expression (6) is exceeded, or when a lower limit of the conditional expression (6) is not reached, overcorrection or undercorrection of the light amount occurs in the image plane, causing donut-shaped unevenness in light amount.

As a further embodiment mode of the present invention, it is desired that the held correction data be expressed by a conditional expression (7), which is a fourth-order expression as given below:

$$Dc = C4 \times h^4 + C3 \times h^3 + C2 \times h^2 + C1 \times h + C0 \tag{7},$$

where Dc represents the data for light amount correction.

In the conditional expression (7), C4, C3, C2, C1, and C0 represent fourth-order, third-order, second-order, first-order, and 0-th order coefficients, respectively, of the image height "h". Values of the coefficients C4, C3, C2, C1, and C0 depend on at least the zoom state, the focus state, and the iris state. With correction data in the image height direction defined by the fourth-order expression that is expressed as the conditional expression (7), only data of each order is required to be held as the number of pieces of correction data under a specific zoom condition, focus condition, and iris condition, for example. This means that the capacity of held data can be reduced.

As a further embodiment mode of the present invention, it is desired that the coefficients C4, C3, C2, C1, and C0 defined by the conditional expression (7) vary depending on only three types of information: information about the zoom lens, information about the focus lens, and information about the stop. In particular, satisfactory light amount correction is accomplished while minimizing data capacity, by using only elements that significantly affect a change in peripheral light amount as variables.

As a further embodiment mode of the present invention, it is desired that the coefficient C4 and the coefficient C3, which are defined by the conditional expression (7), satisfy a conditional expression (8) given below:

$$-0.1 < C3 + 8 \times C4 < 0.1 \qquad (8).$$

The conditional expression (8) defines a relationship of coefficients suitable for light amount correction in the image height direction. When an upper limit of the conditional expression (8) is exceeded, or when a lower limit of the conditional expression (8) is not reached; overcorrection or undercorrection of the light amount occurs in the image plane, causing donut-shaped unevenness in light amount.

As a further embodiment mode of the present invention, it is desired that the constant term C0, which is the 0-th-order coefficient with respect to the image height "h", satisfy a conditional expression (9) given below:

$$0.7 < C0 \times (Fw_{(Zw,F,I)}/F_{(Z,F,I)})^2 < 1.3 \qquad (9).$$

In the conditional expression (9), $F_{(Z,F,I)}$ represents an effective f-number at each optical parameter, Zw represents a wide angle end focal length, and $Fw_{(Zw, F, I)}$ represents an effective f-number at the wide angle end. The coefficient C0, which is a constant term, is theoretically capable of accurate correction of the light amount by satisfying, as a function of the zoom state Z, the focus state F, and the iris state I, a condition expressed as follows:

$$C0_{(Z,F,I)} = (F_{(Z,F,I)}/Fw_{(Zw,F,I)})^2 \qquad (10).$$

However, in a situation in which the user conducts a final check, the correction is affected by, among others, the characteristics of the image pickup element, processing of the image pickup apparatus, and processing executed after a signal is transmitted from the image pickup apparatus. In addition, it is not always favorable for the coefficient C0 to satisfy the expression (10) in consideration of the interpolation processing when the amount of data used in correction is limited due to restrictions on communication or the capacity of a recording apparatus.

It is therefore preferred that C0 be set appropriately within the range of the conditional expression (9).

As a further embodiment mode of the present invention, it is desired that the interchangeable lens include a positive first lens unit and a subsequent lens unit, which follows the first lens unit, in order from the object side. It is desired that the first lens unit be stationary with respect to the image plane during zooming, whereas some lenses in the first lens unit move in an optical axis direction during focusing.

This is a lens configuration characteristic to a lens for moving images, and is defined as a configuration with which the light amount correction effect of the present invention is fully obtained.

As a further embodiment mode of the present invention, it is desired that the interchangeable lens include a built-in extender and a detector configured to detect the insertion/removal state of the extender, and that data for light amount correction be switched with a switch of the extender insertion/removal state.

In the interchangeable lens including the built-in extender, the f-number varies depending on the extender insertion/removal state, and the peripheral light amount fluctuates as well. Accordingly, even more satisfactory light amount correction is accomplished by separately preparing data for light amount correction for when the extender is inserted and data for light amount correction for when the extender is removed, and switching the correction data with a switch of the insertion/removal state.

As a further embodiment mode of the present invention, a selection unit (selector) formed of a switch, a touch panel, or the like may be included in order to enable the user to select whether light amount correction that uses data for light amount correction is to be conducted.

It is further preferred to set the numerical ranges of the conditional expressions (1), (2), (6), (8), and (9) as follows.

$$0.95 < f/ft/(Fnw/Fnt) < 1.2 \qquad (1a)$$

$$0.02 < ((F_{n(f+\alpha f)} - F_{nf}) - (F_{nf} - F_{n(f-\Delta f)}))/N_{(f \pm \Delta f)} < 0.15 \qquad (2a)$$

$$-0.05 < C2 + 6 \times C3 < 0.1 \qquad (6a)$$

$$-0.05 < C3 + 8 \times C4 < 0.05 \qquad (8a)$$

$$0.9 < C_{(Z,F,I)} \times (Fw_{(Zw,F,I)}/F_{(Z,F,I)}) < 1.1 \qquad (9a)$$

Figure 6:
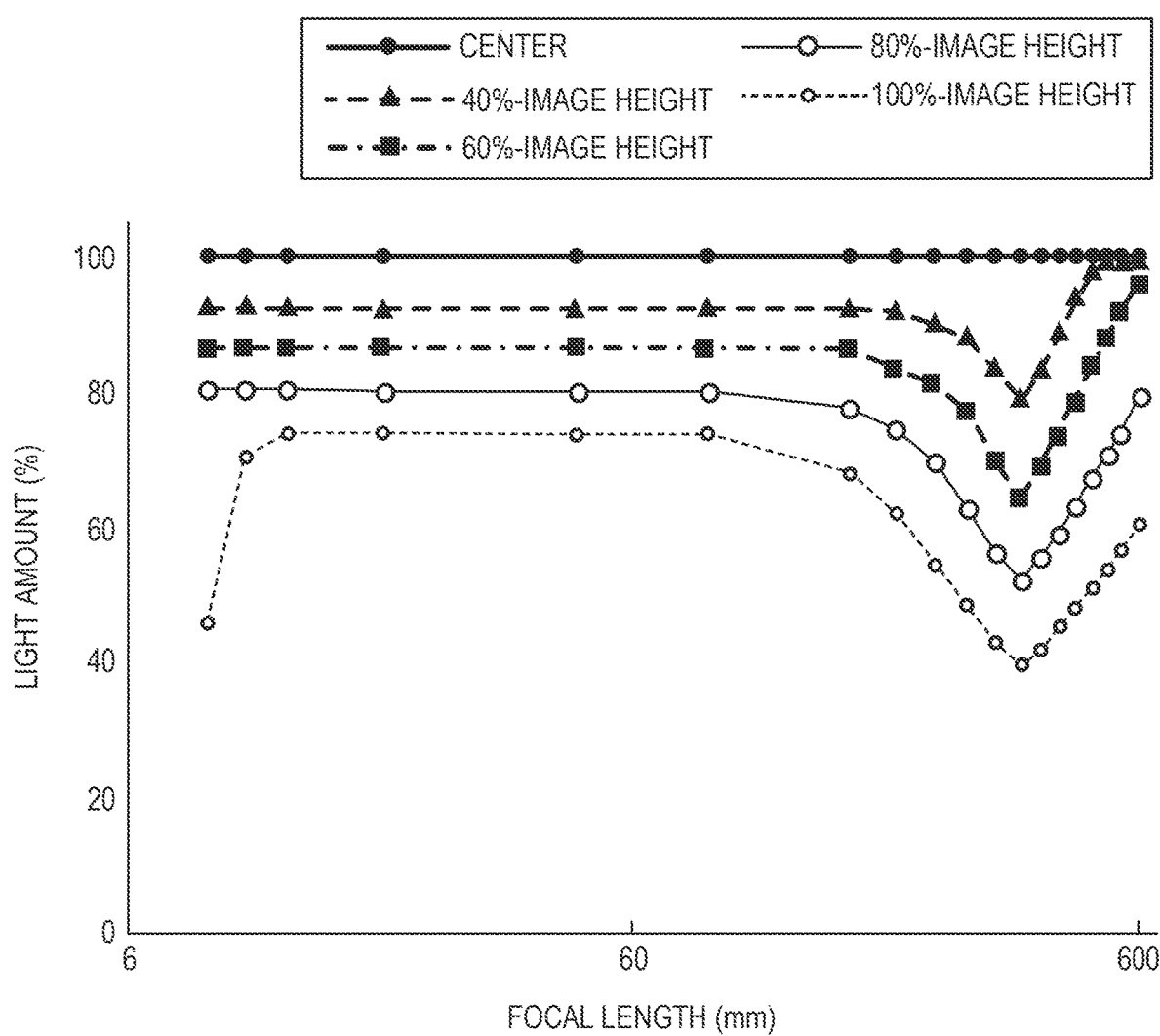
FIG. 6 is a graph for showing light amount changes and zoom division points of the zoom lens of Embodiment that are observed during zooming when a second lens sub-unit is inserted into an optical path, a stop is opened to full aperture, and focus is at infinity.

FIG. 6 is a graph for showing light amount changes and zoom division points of the zoom lens of Embodiment that are observed during zooming when the second lens sub-unit is inserted into the optical path, the stop is opened to full aperture, and focus is at infinity. Plotted portions in FIG. 6 correspond to zoom division points.

Figure 7A:
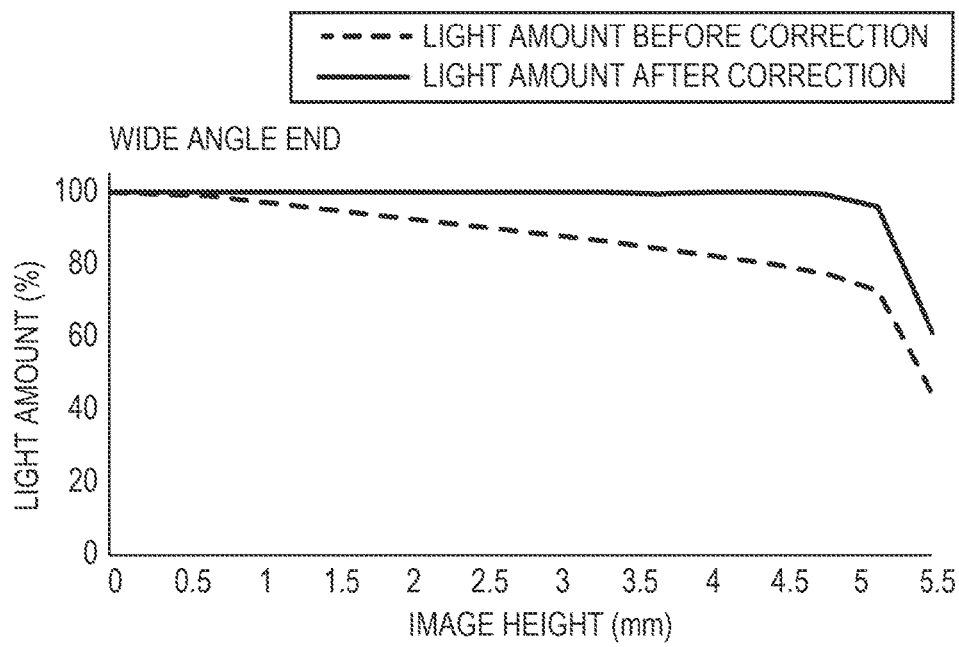
FIG. 7A is a graph for showing light amounts (third-order expressions) of the zoom lens of Embodiment that are observed before and after correction in an image height direction at a wide angle end when the second lens sub-unit is inserted, the stop is opened to full aperture, and focus is at infinity.
Figure 7B:
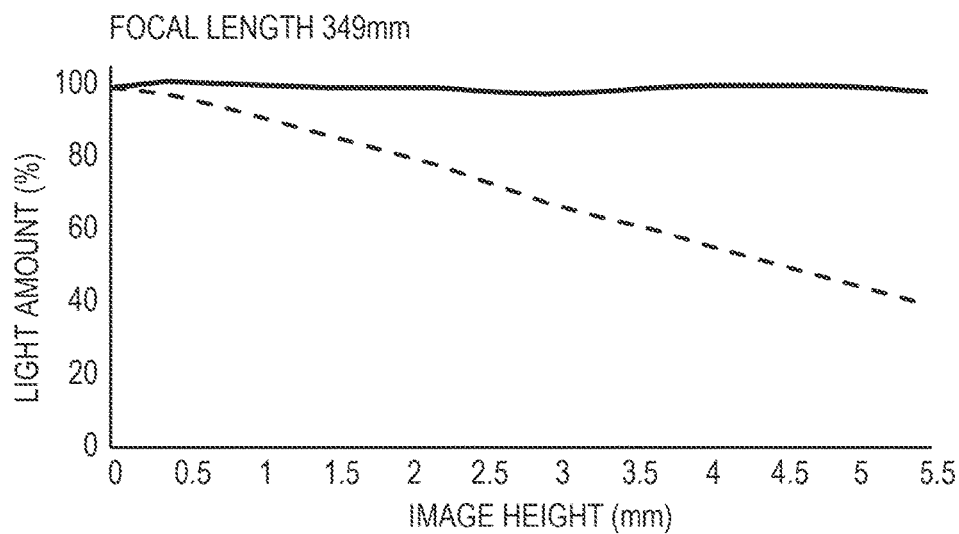
FIG. 7B is a graph for showing light amounts (third-order expressions) of the zoom lens of Embodiment that are observed before and after correction in the image height direction at a focal length of 349 mm when the second lens sub-unit is inserted, the stop is opened to full aperture, and focus is at infinity.
Figure 7C:
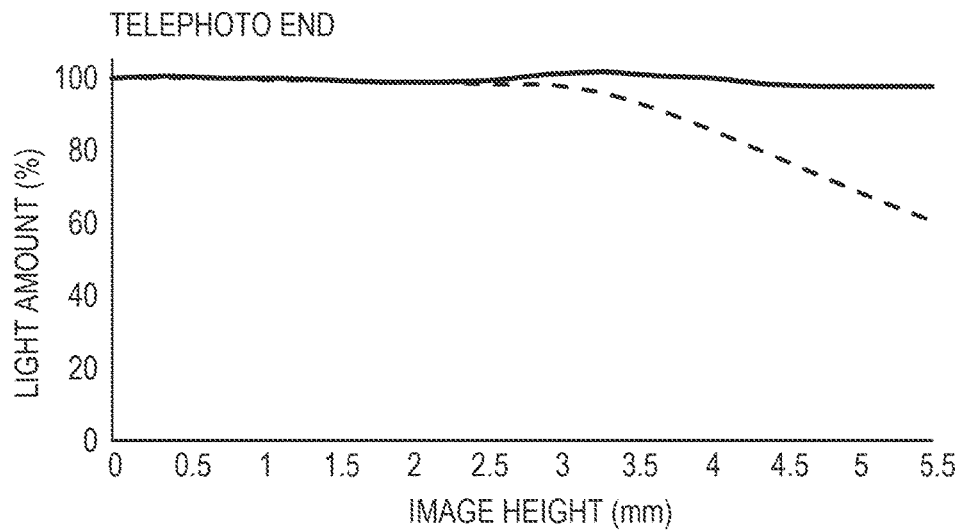
FIG. 7C is a graph for showing light amounts (third-order expressions) of the zoom lens of Embodiment that are observed before and after correction in the image height direction at a telephoto end when the second lens sub-unit is inserted, the stop is opened to full aperture, and focus is at infinity.

FIG. 7A, FIG. 7B, and FIG. 7C are graphs for showing the light amount before correction, the correction amount, and the light amount after correction in correction that is performed on the zoom lens of Embodiment by approximation with a third-order function in the image height direction at the wide angle end, a focal length of 349 mm, and the telephoto end, respectively, when the second lens sub-unit is inserted into the optical path, the stop is opened to full aperture, and focus is at infinity. In any of FIG. 7A to FIG. 7C, results of the light amount correction including center correction are shown. Correction shown in FIG. 8A, FIG. 8B, FIG. 8C, FIG. 10A, FIG. 10B, FIG. 10C, FIG. 11A FIG. 11B, and FIG. 11C, which are described later, is also the light amount correction including center correction. Although correction in an area of a peripheral image height seems insufficient in the light amount after correction at the wide angle end, this is the result of correction in which overcorrection from correction that is obtained by interpolation processing between the wide angle end and a zoom division point immediately preceding the wide angle end, due to a characteristic in that the light amount drops rapidly at the wide angle end at the 100% image height of FIG. 6. The same applies to the correction shown in FIG. 8A to FIG. 8C, which are described later.

Figure 8A:
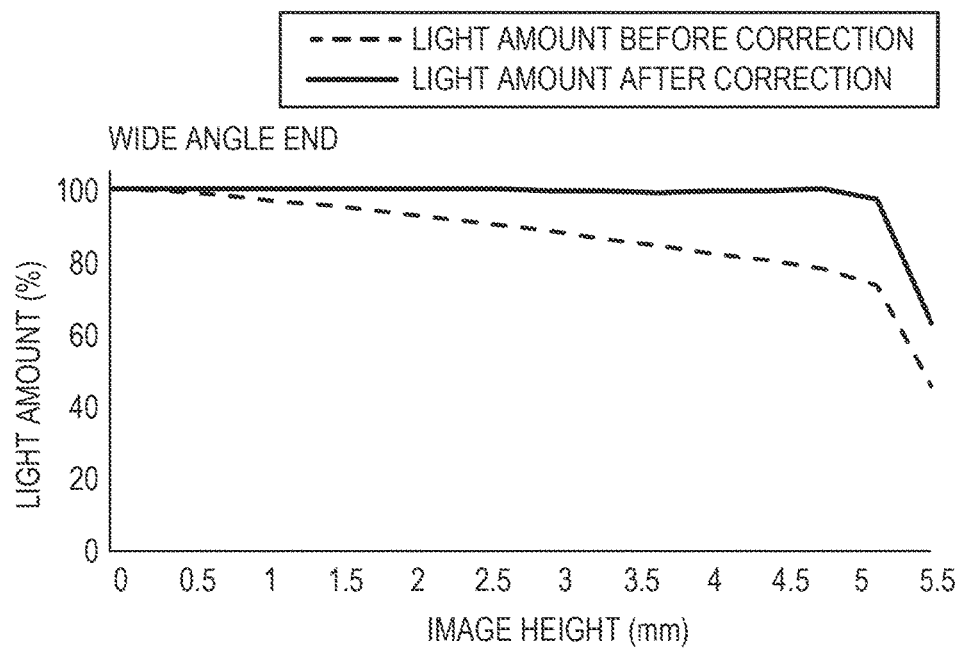
FIG. 8A is a graph for showing light amounts (fourth-order expressions) of the zoom lens of Embodiment that are observed before and after correction in the image height direction at the wide angle end when the second lens sub-unit is inserted into the optical path, the stop is opened to full aperture, and focus is at infinity.
Figure 8B:
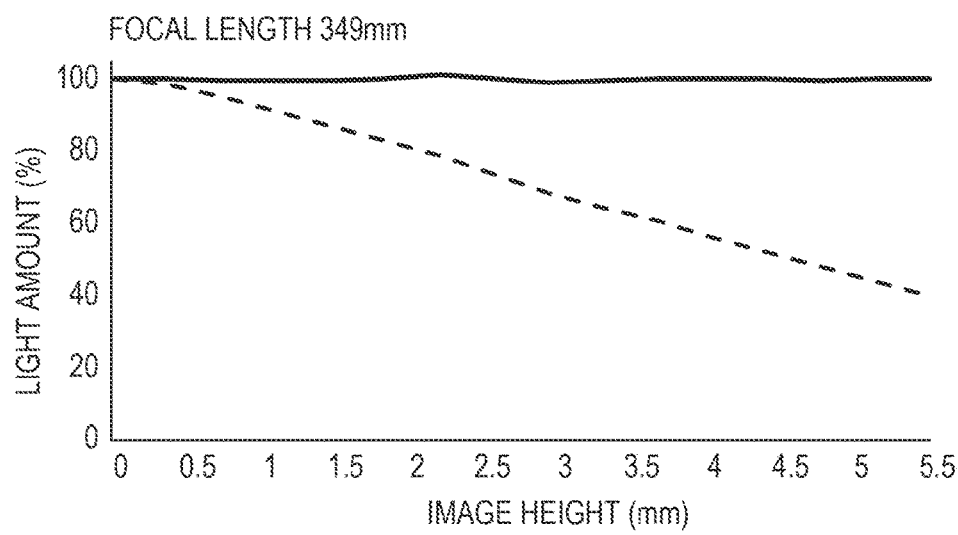
FIG. 8B is a graph for showing light amounts (fourth-order expressions) of the zoom lens of Embodiment that are observed before and after correction in the image height direction at a focal length of 349 mm when the second lens sub-unit is inserted into the optical path, the stop is opened to full aperture, and focus is at infinity.
Figure 8C:
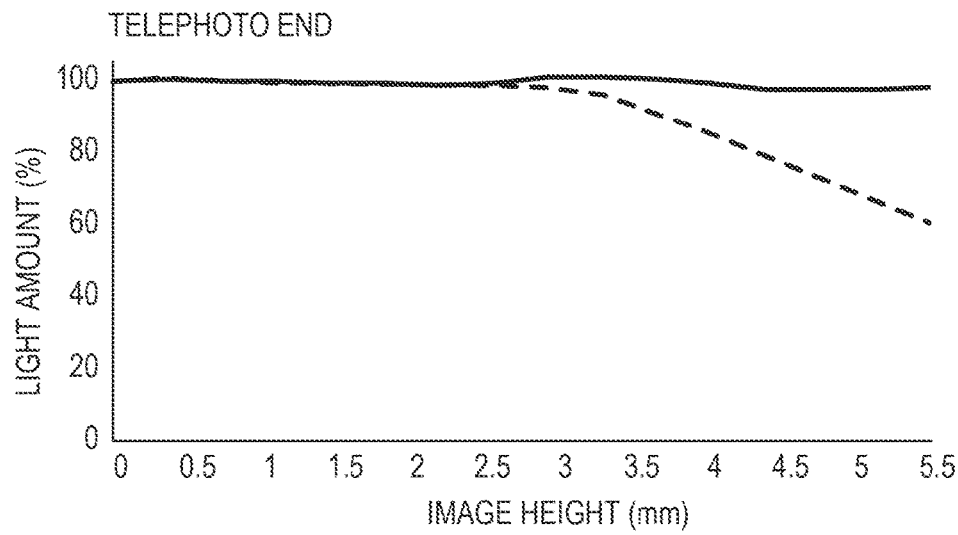
FIG. 8C is a graph for showing light amounts (fourth-order expressions) of the zoom lens of Embodiment that are observed before and after correction in the image height direction at the telephoto end when the second lens sub-unit is inserted into the optical path, the stop is opened to full aperture, and focus is at infinity.

FIG. 8A, FIG. 8B, and FIG. 8C are graphs for showing the light amount before correction, the correction amount, and the light amount after correction in correction that is performed on the zoom lens of Embodiment by approximation with a fourth-order function in the image height direction at the wide angle end, a focal length of 349 mm, and the telephoto end, respectively, when the second lens sub-unit is inserted into the optical path, the stop is opened to full aperture, and focus is at infinity.

Figure 9:
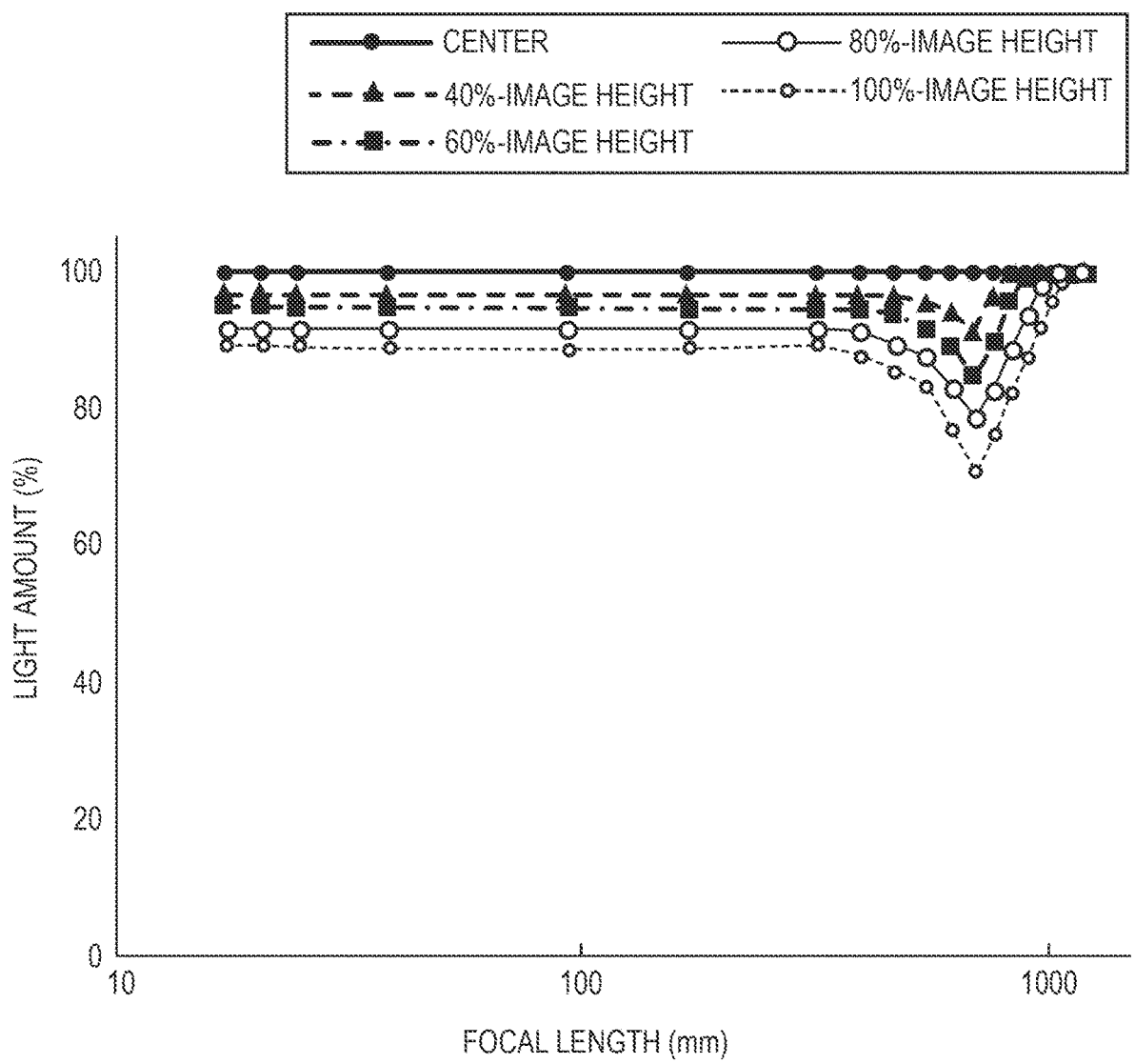
FIG. 9 is a graph for showing light amount changes and zoom division points of the zoom lens of Embodiment that are observed during zooming when the extender lens unit is inserted into the optical path, the stop is opened to full aperture, and focus is at infinity.

FIG. 9 is a graph for showing light amount changes and zoom division points of the zoom lens of Embodiment that are observed during zooming when the extender lens unit is inserted into the optical path, the stop is opened to full aperture, and focus is at infinity. Plotted portions in FIG. 9 correspond to zoom division points.

Figure 10A:
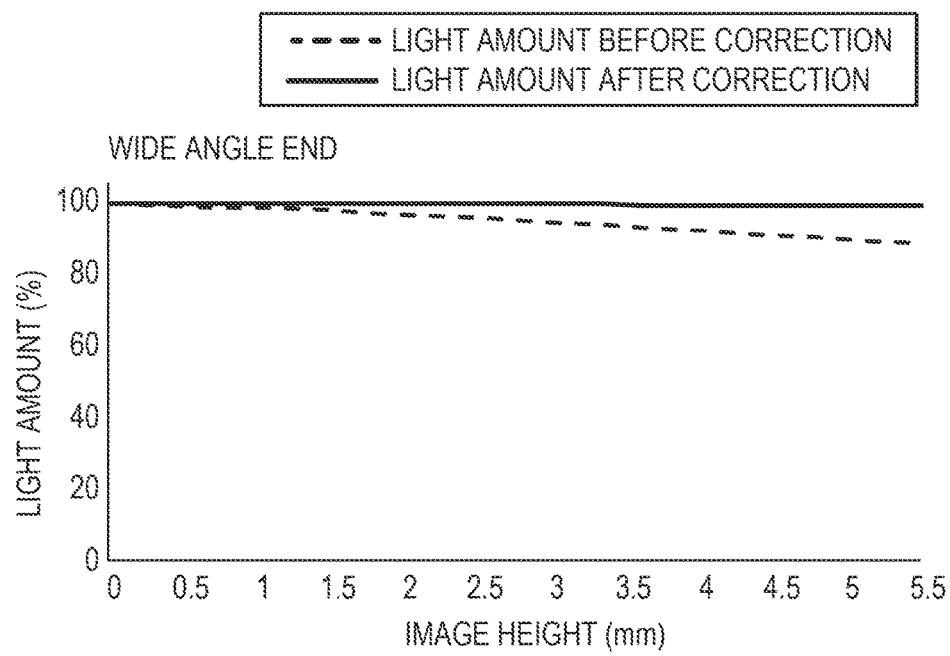
FIG. 10A is a graph for showing light amounts (third-order expressions) of the zoom lens of Embodiment that are observed before and after correction in the image height direction at the wide angle end when the extender lens unit is inserted into the optical path, the stop is opened to full aperture, and focus is at infinity.
Figure 10B:
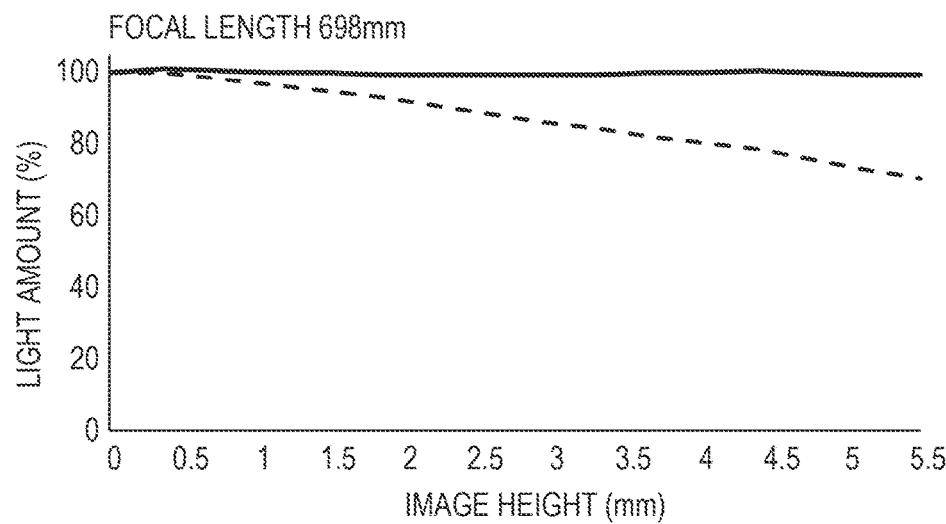
FIG. 10B is a graph for showing light amounts (third-order expressions) of the zoom lens of Embodiment that are observed before and after correction in the image height direction at a focal length of 349 mm when the extender lens unit is inserted into the optical path, the stop is opened to full aperture, and focus is at infinity.
Figure 10C:
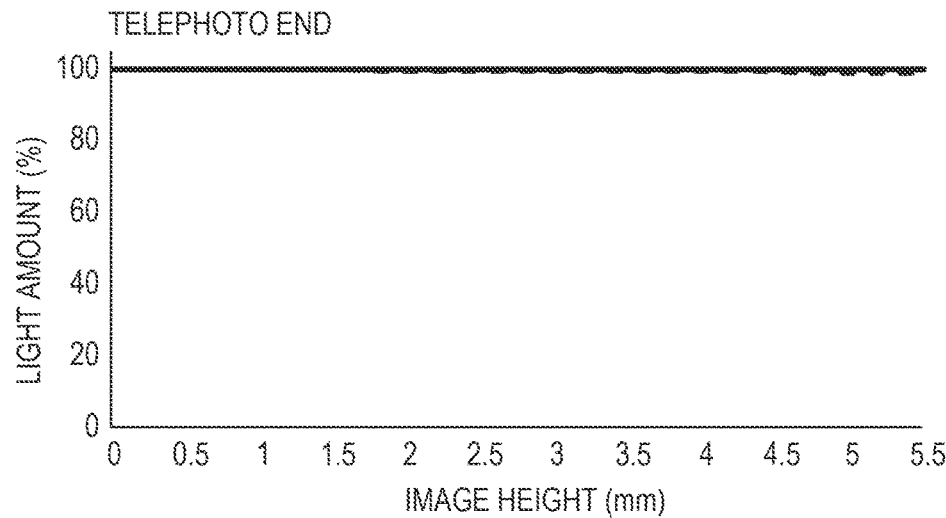
FIG. 10C is a graph for showing light amounts (third-order expressions) of the zoom lens of Embodiment that are observed before and after correction in the image height direction at the telephoto end when the extender lens unit is inserted into the optical path, the stop is opened to full aperture, and focus is at infinity.

FIG. 10A, FIG. 10B, and FIG. 10C are graphs for showing the light amount before correction, the correction amount, and the light amount after correction in correction that is performed on the zoom lens of Embodiment by approximation with a third-order function in the image height direction at the wide angle end, a focal length of 349 mm, and the telephoto end, respectively, when the extender lens unit is inserted into the optical path, the stop is opened to full aperture, and focus is at infinity.

Figure 11A:
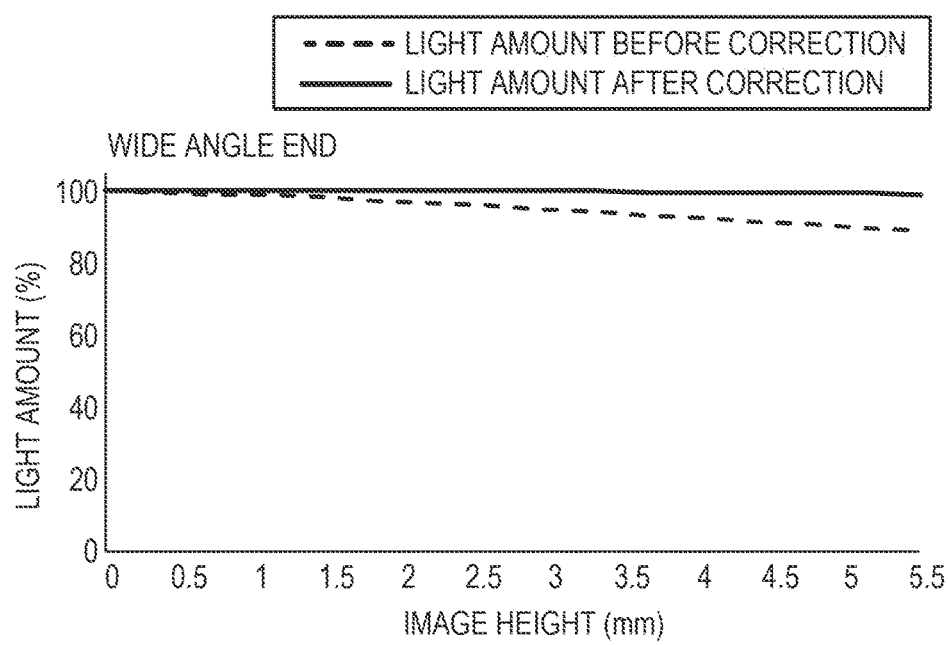
FIG. 11A is a graph for showing light amounts (fourth-order expressions) of the zoom lens of Embodiment that are observed before and after correction in the image height direction at the wide angle end when the extender lens unit is inserted into the optical path, the stop is opened to full aperture, and focus is at infinity.
Figure 11B:
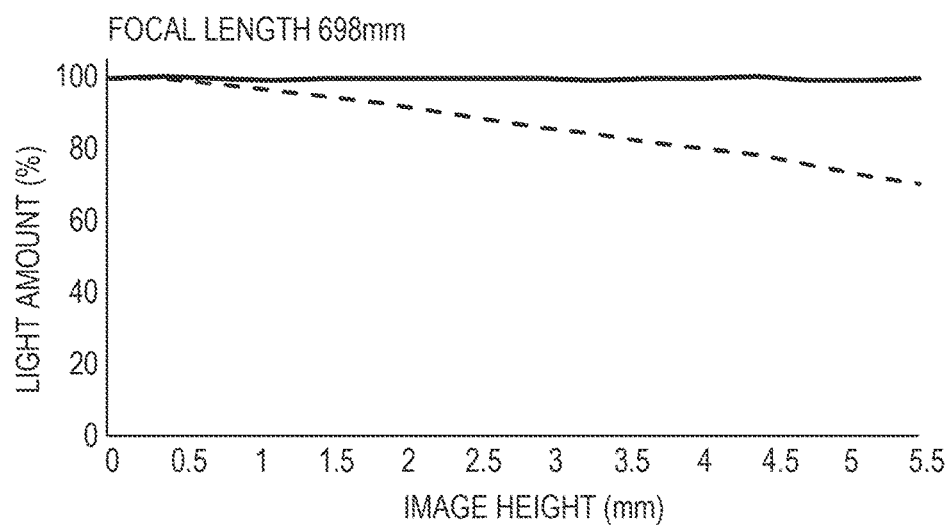
FIG. 11B is a graph for showing light amounts (fourth-order expressions) of the zoom lens of Embodiment that are observed before and after correction in the image height direction at a focal length of 349 mm when the extender lens unit is inserted into the optical path, the stop is opened to fill aperture, and focus is at infinity.
Figure 11C:
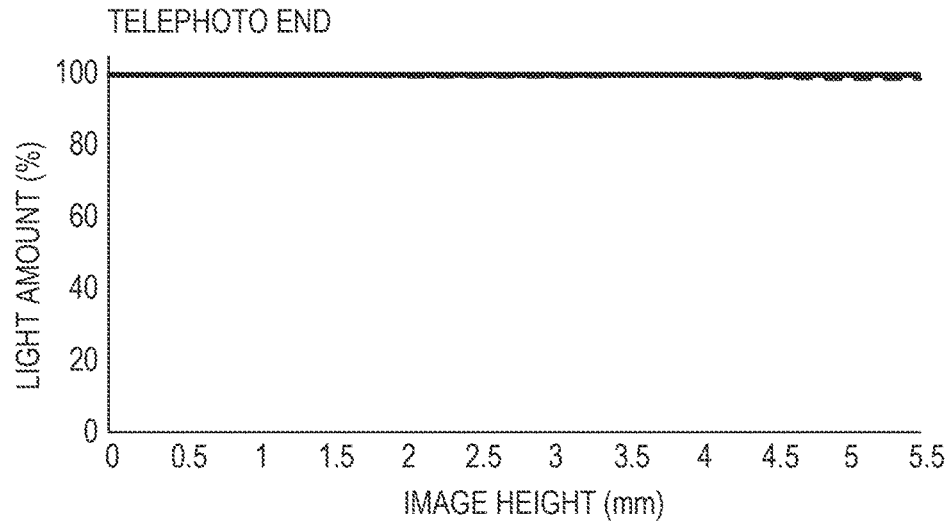
FIG. 11C is a graph for showing light amounts (fourth-order expressions) of the zoom lens of Embodiment that are observed before and after correction in the image height direction at the telephoto end when the extender lens unit is inserted into the optical path, the stop is opened to full aperture, and focus is at infinity.

FIG. 11A, FIG. 11B, and FIG. 11C are graphs for showing the light amount before correction, the correction amount, and the light amount after correction in correction that is performed on the zoom lens of Embodiment by approximation with a fourth-order function in the image height direction at the wide angle end, a focal length of 349 mm, and the telephoto end, respectively, when the extender lens unit is inserted into the optical path, the stop is opened to full aperture, and focus is at infinity.

As shown in FIG. 6 to FIG. 11C, a comparison between the light amount before correction and the light amount after correction reveals that the light amount is corrected satisfactorily by the light amount correction processing of Embodiment.

As in Embodiment, which is exemplification, satisfactory light amount correction is accomplished at each image height from the central image height to the peripheral image height with a small amount of data, by performing light amount correction based on the coefficient of each order of the light amount correction amount that is approximated by an n-th-order polynomial with respect to the image height. The image pickup system, however, may have a processing mode in which only the 0-th-order coefficient (constant term) C0 is provided for light amount correction processing out of the coefficients of the respective orders of the light amount correction amount that is approximated by an n-th-order polynomial with respect to the image height. This processing mode, too, can provide a sufficient light amount correction effect, depending on conditions under which the picked up image is used, for example, when the main purpose is to correct a drop in light amount due to F drop on the telephoto side. Light amount correction for that purpose uses only correction data that is independent of the image height and is dependent on the states of the zoom lens, the focus lens, the stop, and the extender lens unit. In that case, the image pickup system may have an operation mode in which the 0-th-order coefficient C0 alone is transmitted as required correction data from the lens apparatus to the image pickup apparatus, or an operation mode in which a processing unit configured to execute light amount correction processing takes only the 0-th-order coefficient C0 into consideration in executing the light amount correction processing.

Numerical data corresponding to Embodiment is shown in Numerical Embodiment of the present invention to be described later. Symbol "i" represents the order of a surface from the object side, symbol "ri" represents a curvature radius of the i-th surface from the object side, symbol "di" represents an interval between the i-th surface and the (i+1)-th surface from the object side, and symbols "ndi" and "vdi" represent a refractive index and an Abbe number of an optical member (optical medium) between the i-th surface and the (i+1)-th surface, respectively. Symbol BF represents an air-equivalent back focus. The last three surfaces correspond to a glass block, for example, a filter. The asterisk (*) attached to the surface number of the data in Numerical Embodiment indicates that the surface is aspherical.

When an X axis is set in the optical axis direction, an H axis is set in a direction perpendicular to the optical axis, a direction of travel of light is defined as positive, a paraxial curvature radius is represented by R, a conic constant is represented by "k", and aspherical coefficients are represented by A3, A4, A5, A6, A7, A8, A9, A10, A11, A12, A13, A14, A15, and A16, the aspherical shape is expressed by the following expression. Further, "e-z" represents "×10$^{-z}$" in the aspherical surface data.

$$X = \frac{H^2/R}{1+\sqrt{1-(1+k)(H/R)^2}} + A4H^4 + A6H^6 +$$
$$A8H^8 + A10H^{10} + A12H^{12} + A14H^{14} + A16H^{16} + A3H^3 +$$
$$A5H^5 + A7H^7 + A9H^9 + A11H^{11} + A13H^{13} + A15H^{15}$$

Values corresponding to elements of the conditional expressions (6) and (8) in Numerical Embodiment are shown in Table 1. High uniformity of light amount is accomplished from the center of the image plane to the perimeter of the image plane through light amount correction by satisfying the conditional expressions (6) and (8).

(Image Pickup Apparatus)

Figure 12:
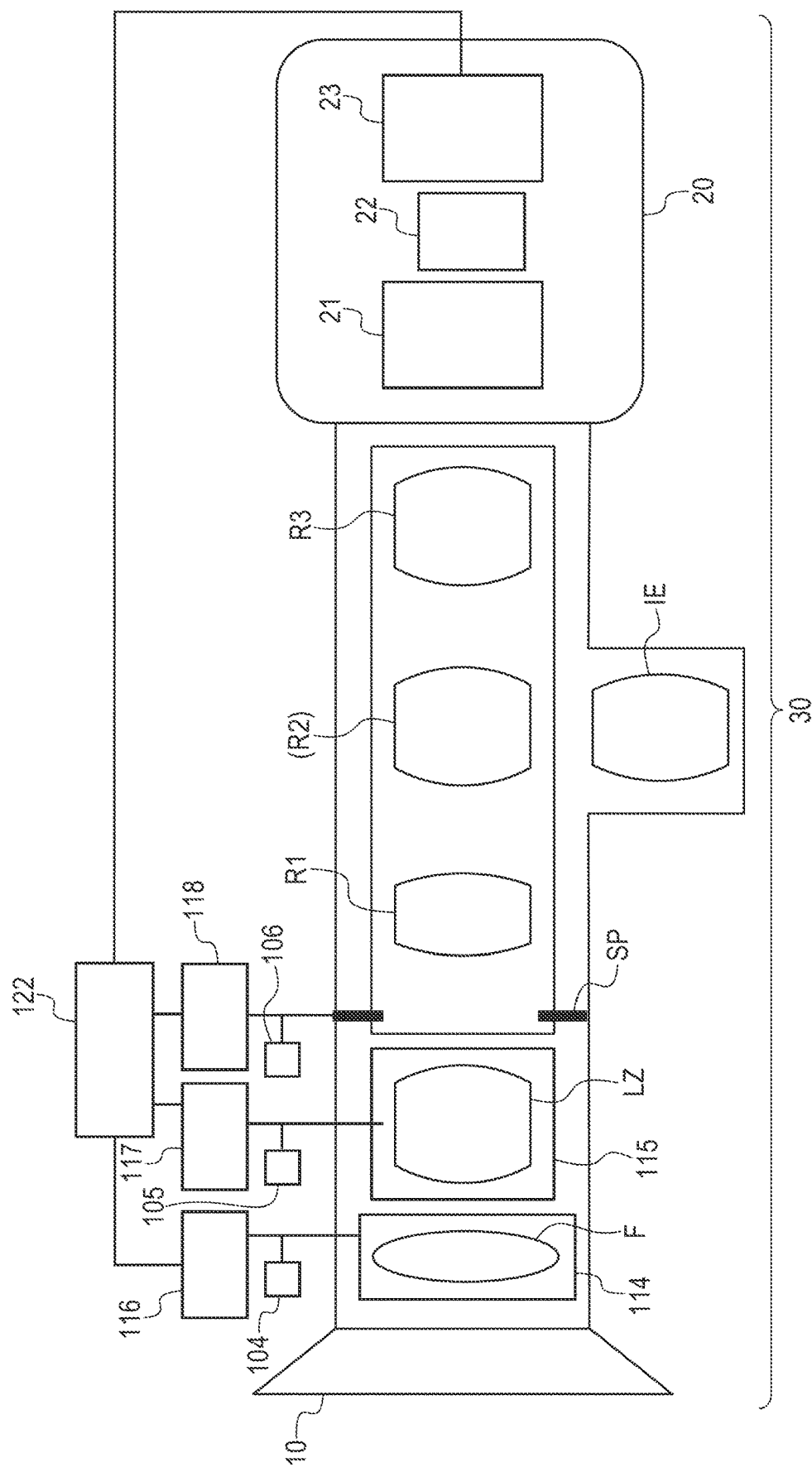
FIG. 12 is a schematic diagram of a main part of an image pickup apparatus according to at least one embodiment of the present invention.

FIG. 12 is a schematic diagram of a main part of an image pickup apparatus (television camera system) using the interchangeable lens according to Embodiment of the present invention as an image pickup optical system. An interchangeable lens 10, which is the interchangeable lens according to Embodiment, is illustrated in FIG. 12. A camera 20 is illustrated in FIG. 12. The lens apparatus 10 may be detachably mounted on the camera 20, to thereby construct an image pickup apparatus 30. The lens apparatus 10 includes a first lens unit F, a zoom portion LZ, and a lens unit R for imaging. The first lens unit F includes a lens unit configured to move during focusing.

The zoom portion LZ includes at least two lens units configured to move during zooming. In the illustrated embodiment, on the image side of the zoom portion LZ, an aperture stop SP, a lens unit R1, a lens unit R2, and a lens unit R3 are arranged, and the lens apparatus 10 includes an extender lens unit IE, which is insertable into or removable from an optical path. Switching between the lens unit R2 and the extender lens unit IE enables a focal length range of an entire system of the lens apparatus 10 to be changed. Drive mechanisms 114 and 115, such as a helicoid or a cam, drive the first lens unit F and the zoom portion LZ in an optical axis direction, respectively. Motors (drive units) 116 to 118 electrically drive the drive mechanism 114, the drive mechanism 115, and the aperture stop SP, respectively.

Detectors 104 to 106, such as an encoder, a potentiometer, or a photo-sensor, are configured to detect positions of the first lens unit F and the zoom portion LZ on the optical axis, and an aperture size of the aperture stop SP, for example. The camera 20 includes a glass block 21, which corresponds to an optical filter or a color separation optical system provided within the camera 20. Further, an image pickup element (photoelectric transducer) 22, such as a charge-coupled device (CCD) sensor or a complementary metal-oxide semiconductor (CMOS) sensor, is configured to receive an object image formed by the lens apparatus 10. Further, central processing units (CPUs) 23 and 122 are configured to control the driving of the camera 20 and the lens apparatus 10 in various manners.

Through application of the interchangeable lens according to at least one embodiment of the present invention to a camera system as described above, the image pickup apparatus having the high optical performance may be achieved.

In Embodiment, which is exemplification, image data converted by photoelectric conversion in the image pickup element of the camera apparatus is corrected inside the camera apparatus, based on the data for light amount correction of the optical correction table. However, the present invention is not limited thereto. An external apparatus (a processing apparatus) may receive the image data from the camera apparatus and the data for light amount correction from the lens apparatus to execute light amount correction processing.

The exemplary embodiments of the present invention are described above, but the present invention is not limited to those embodiments and can be modified and changed variously within the scope of the gist thereof.

Numerical Embodiment (When the Second Lens Sub-Unit is Inserted into the Optical Path)

| Unit mm | | | | | |
|---|---|---|---|---|---|
| Surface data | | | | | |
| Surface Number i | ri | di | ndi | vdi | Effective diameter |
| 1 | 1,571.411 | 5.91 | 1.90366 | 31.3 | 212.83 |
| 2 | 361.491 | 3.13 | | | 205.43 |
| 3 | 389.831 | 20.85 | 1.43387 | 95.1 | 204.88 |
| 4 | −1,519.134 | 25.99 | | | 903.52 |
| 5 | 379.388 | 19.40 | 1.43387 | 95.1 | 198.91 |
| 6 | −1,690.060 | 0.25 | | | 198.64 |
| 7 | 270.376 | 20.46 | 1.43387 | 95.1 | 194.91 |
| 8 | 5,840.434 | 1.18 | | | 193.83 |
| 9 | 190.778 | 14.41 | 1.59240 | 68.3 | 182.16 |
| 10 | 365.545 | (Variable) | | | 180.35 |
| 11* | 11,015.733 | 2.20 | 2.00330 | 28.3 | 48.62 |
| 12 | 41.065 | 10.49 | | | 41.92 |
| 13 | −62.377 | 1.40 | 1.88300 | 40.8 | 41.20 |
| 14 | 65.176 | 9.88 | 1.95906 | 17.5 | 42.38 |
| 15 | −89.087 | 2.72 | | | 43.74 |
| 16 | −51.909 | 1.60 | 1.83400 | 37.2 | 43.88 |
| 17 | −103.320 | (Variable) | | | 46.02 |
| 18 | 115.185 | 11.58 | 1.59201 | 67.0 | 78.48 |
| 19* | −2,087.691 | 0.50 | | | 78.91 |
| 20 | 142.758 | 13.08 | 1.59201 | 67.0 | 80.06 |
| 21 | −231.655 | 0.20 | | | 79.67 |
| 22 | 122.793 | 2.50 | 1.80518 | 25.4 | 76.01 |
| 23 | 57.717 | 18.11 | 1.43387 | 95.1 | 71.57 |
| 24 | −564.234 | 0.50 | | | 70.45 |
| 25* | 364.246 | 6.50 | 1.49700 | 81.5 | 69.33 |
| 26 | −414.835 | (Variable) | | | 68.15 |
| 27 (Stop) | ∞ | 5.89 | | | 31.81 |
| 28 | −147.172 | 1.40 | 1.81600 | 46.6 | 32.30 |
| 29 | 46.924 | 1.05 | | | 31.20 |
| 30 | 37.303 | 4.69 | 1.80810 | 22.8 | 31.30 |
| 31 | 420.501 | 3.37 | | | 30.90 |
| 32 | −76.047 | 1.40 | 1.88300 | 40.8 | 30.60 |
| 33 | 191.170 | 11.30 | | | 30.40 |
| 34 | −41.223 | 1.78 | 1.65160 | 58.5 | 26.67 |
| 35 | 580.472 | 3.52 | 1.80518 | 25.4 | 27.78 |
| 36 | −156.414 | 6.46 | | | 28.43 |
| 37 | −103.332 | 5.71 | 1.70154 | 41.2 | 30.13 |
| 38 | −53.979 | 10.53 | | | 31.42 |
| 39 | −216.194 | 4.49 | 1.50137 | 56.4 | 32.25 |
| 40 | −43.973 | 0.74 | | | 32.44 |
| 41 | −72.585 | 1.30 | 1.88300 | 40.8 | 31.89 |
| 42 | 61.011 | 9.51 | 1.50137 | 56.4 | 32.28 |
| 43 | −35.679 | 0.20 | | | 33.06 |
| 44 | 96.272 | 8.69 | 1.49700 | 81.5 | 32.15 |
| 45 | −31.822 | 1.70 | 1.88300 | 40.8 | 31.45 |
| 46 | −176.143 | 2.14 | | | 31.79 |
| 47 | 50.459 | 8.14 | 1.48749 | 70.2 | 31.95 |
| 48 | −79.751 | 5.00 | | | 31.49 |
| 49 | ∞ | 33.00 | 1.60859 | 46.4 | 60.00 |
| 50 | ∞ | 13.20 | 1.51633 | 64.2 | 60.00 |
| 51 | ∞ | 18.00 | | | 60.00 |
| Image plane | ∞ | | | | |

-continued

Unit mm

Aspherical surface data

Eleventh surface

| K = −2.61129e+006 | A4 = 1.14924e−006 | A6 = −4.20242e−010 | A8 = 7.06050e−012 |
| A10 = 1.71748e−014 | A12 = −3.95143e−018 | A14 = −2.50492e−020 | A16 = 2.74832e−023 |
| A3 = −7.41007e−007 | A5 = −2.86209e−008 | A7 = 4.68402e−011 | A9 = −6.67517e−013 |
| A11 = −2.87644e−016 | A13 = 1.44174e−018 | A15 = −1.26241e−021 | |

Nineteenth surface

| K = −8.09196e+003 | A4 = 2.70610e−007 | A6 = 1.07566e−009 | A8 = −3.82716e−014 |
| A10 = −1.89869e−016 | A12 = 1.74435e−020 | A14 = −2.31461e−023 | A16 = 5.87253e−027 |
| A3 = −1.02923e−007 | A5 = −2.58308e−008 | A7 = −1.15844e−011 | A9 = 3.14187e−015 |
| A11 = 2.64931e−018 | A13 = 8.56747e−022 | A15 = −2.81713e−025 | |

Twenty-fifth surface

| K = 6.92275e+001 | A4 = −4.53959e−007 | A6 = −6.59771e−011 | A8 = −3.55842e−013 |
| A10 = −1.48669e−016 | A12 = 8.98957e−020 | A14 = 6.50522e−022 | A16 = 1.24233e−026 |
| A3 = 7.06566e−007 | A5 = −1.77804e−008 | A7 = 3.13155e−011 | A9 = 8.81552e−016 |
| A11 = −1.46851e−017 | A13 = 1.62371e−021 | A15 = −1.37737e−023 | |

Various data
Zoom ratio 69.98

|  | Wide angle | Intermediate | Telephoto |
| --- | --- | --- | --- |
| Focal length | 8.60 | 341.65 | 601.79 |
| F-number | 1.80 | 1.80 | 3.11 |
| Half angle of view | 32.60 | 0.92 | 0.52 |
| Image height | 5.50 | 5.50 | 5.50 |
| Total lens length | 624.07 | 624.07 | 624.07 |
| BF | 52.17 | 52.17 | 52.17 |
| d10 | 3.03 | 178.18 | 184.56 |
| d17 | 279.71 | 41.91 | 15.69 |
| d26 | 3.00 | 65.65 | 85.49 |
| d33 | 11.30 | 11.30 | 11.30 |
| Entrance pupil position | 126.14 | 3,180.82 | 6,438.93 |
| Exit pupil position | 141.46 | 141.46 | 141.46 |
| Front principal point position | 135.34 | 4,467.89 | 9,974.12 |
| Rear principal point position | 9.40 | −323.64 | −583.79 |

Zoom lens unit data

| Unit | First surface | Focal length | Lens structure length | Front principal point position | Rear principal point position |
| --- | --- | --- | --- | --- | --- |
| 1 | 1 | 248.14 | 110.88 | 64.60 | −17.20 |
| 7 | 11 | −27.25 | 28.28 | 3.76 | −16.43 |
| 3 | 18 | 70.50 | 52.98 | 12.00 | −25.30 |
| 41 | 77 | −50.95 | 17.80 | 11.51 | −2.55 |
| 42 | 34 | −411.92 | 17.46 | −49.56 | −70.97 |
| 43 | 39 | 52.26 | 36.91 | 20.24 | −4.47 |
| P | 49 | ∞ | 46.20 | 14.58 | −14.58 |

Single lens data

| Lens | First surface | Focal length |
| --- | --- | --- |
| 1 | 1 | −516.86 |
| 7 | 3 | 715.59 |
| 3 | 5 | 714.36 |
| 4 | 7 | 651.06 |
| 5 | 9 | 651.23 |
| 6 | 11 | −40.75 |
| 7 | 13 | −35.70 |
| 8 | 14 | 39.99 |
| 9 | 16 | −126.08 |
| 10 | 18 | 184.10 |
| 11 | 20 | 150.63 |
| 12 | 22 | −136.36 |
| 13 | 23 | 121.45 |
| 14 | 25 | 390.18 |

-continued

| Unit mm | | |
|---|---|---|
| 15 | 28 | −43.24 |
| 16 | 30 | 49.86 |
| 17 | 32 | −61.11 |
| 18 | 34 | −58.76 |
| 19 | 35 | 151.95 |
| 20 | 37 | 152.86 |
| 21 | 39 | 108.69 |
| 22 | 41 | −37.15 |
| 23 | 42 | 46.24 |
| 24 | 44 | 49.09 |
| 25 | 45 | −43.97 |
| 26 | 47 | 64.51 |
| 27 | 49 | 0.00 |
| 28 | 50 | 0.00 |

Light amount correction coefficient data (when the second lens sub-unit is inserted into the optical path)

(A) Third-Order Correction

TABLE 1

| Center correction | Focal length | C3 | C2 | C1 | C0 |
|---|---|---|---|---|---|
| Not corrected | Wide angle end | −3.34E−04 | 9.78E−03 | 1.90E−02 | 1.00E+00 |
| | 349 mm | −6.28E−03 | 7.58E−02 | −7.87E−03 | 1.00E+00 |
| | Telephoto end | 8.10E−03 | −2.82E−02 | 2.30E−02 | 1.00E+00 |
| Corrected | Wide angle end | −3.34E−04 | 9.78E−03 | 1.90E−02 | 1.00E+00 |
| | 349 mm | −6.29E−03 | 7.59E−02 | −7.88E−03 | 1.00E+00 |
| | Telephoto end | 4.71E−02 | −1.64E−01 | 1.34E−01 | 5.82E+00 |

(B) Fourth-Order Correction

TABLE 2

| Center correction | Focal length | C4 | C3 | C2 | C1 | C0 |
|---|---|---|---|---|---|---|
| Not corrected | Wide angle end | 5.69E−04 | −5.19E−03 | 2.19E−02 | 1.03E−02 | 1.00E+00 |
| | 349 mm | 2.62E−03 | −2.43E−02 | 1.05E−01 | −8.62E−03 | 1.00E+00 |
| | Telephoto end | 3.18E−04 | 5.42E−03 | −2.25E−02 | 2.11E−02 | 1.00E+00 |
| Corrected | Wide angle end | 5.69E−04 | −5.19E−03 | 2.19E−02 | 1.03E−02 | 1.00E+00 |
| | 349 mm | 2.62E−03 | −2.43E−02 | 1.05E−01 | −8.63E−03 | 1.00E+00 |
| | Telephoto end | 1.85E−03 | 3.15E−02 | −1.31E−01 | 1.23E−01 | 5.82E+00 |

<Extender Lens Unit>

| Unit mm | | | | |
|---|---|---|---|---|
| Surface data | | | | |
| Surface Number i | ri | di | ndi | vdi |
| 33 | 191.170 | 6.00 | | |
| IE 34 | 42.262 | 5.24 | 1.48749 | 70.2 |
| IE 35 | −70.252 | 0.50 | | |
| IE 36 | 15.752 | 4.86 | 1.51633 | 64.1 |
| IE 37 | 27.135 | 1.00 | 2.05090 | 26.9 |
| IE 38 | 16.120 | 5.52 | | |
| IE 39 | 85.201 | 1.00 | 1.95375 | 32.3 |
| IE 40 | 12.663 | 5.08 | 1.78472 | 25.7 |
| IE 41 | −224.130 | 1.64 | | |
| IE 42 | −32.247 | 1.00 | 1.81600 | 46.6 |
| IE 43 | 150.003 | 7.47 | | |

-continued

Unit mm (When the extender lens unit is inserted into the optical path)

Various data

|  | Wide angle | Intermediate | Telephoto |
|---|---|---|---|
| Focal length | 17.20 | 683.29 | 1,203.58 |
| F-number | 3.60 | 3.60 | 6.22 |
| Half angle of view | 17.73 | 0.46 | 0.26 |
| Image height | 5.50 | 5.50 | 5.50 |
| Total lens length | 624.07 | 624.07 | 624.07 |
| BF | 52.17 | 52.17 | 52.17 |
| Entrance pupil position | 126.14 | 3,180.82 | 6,438.93 |
| Exit pupil position | −363.65 | −363.65 | −363.65 |
| Front principal point position | 142.56 | 2,640.80 | 3,846.92 |
| Rear principal point position | 0.80 | −665.28 | −1,185.58 |

Extender lens unit data

| Unit | First surface | Focal length | Lens structure length | Front principal point position | Rear principal point position |
|---|---|---|---|---|---|
| EXT | 34 | −467.98 | 25.83 | 350.53 | 188.84 |

Single lens data
(When the extender lens unit is inserted into the optical path)

| Lens | First surface | Focal length |
|---|---|---|
| 1 | 1 | −516.86 |
| 7 | 3 | 715.59 |

Unit mm

| 3 | 5 | 714.36 |
|---|---|---|
| 4 | 7 | 651.06 |
| 5 | 9 | 651.23 |
| 6 | 11 | −40.75 |
| 7 | 13 | −35.70 |
| 8 | 14 | 39.99 |
| 9 | 16 | −126.08 |
| 10 | 18 | 184.10 |
| 11 | 20 | 150.63 |
| 12 | 22 | −136.36 |
| 13 | 23 | 121.45 |
| 14 | 25 | 390.18 |
| 15 | 28 | −43.24 |
| 16 | 30 | 49.86 |
| 17 | 32 | −61.11 |
| IE18 | IE34 | 54.78 |
| IE19 | IE36 | 63.25 |
| IE20 | IE37 | −39.29 |
| IE21 | IE39 | −15.59 |
| IE22 | IE40 | 15.28 |
| IE23 | IE42 | −32.28 |
| 21 | 39 | 108.69 |
| 22 | 41 | −37.15 |
| 23 | 42 | 46.24 |
| 24 | 44 | 49.09 |
| 25 | 45 | −43.97 |
| 26 | 47 | 64.51 |
| 27 | 49 | 0.00 |
| 28 | 50 | 0.00 |

Light amount correction coefficient data (when the extender lens unit is inserted into the optical path)

(A) Third-Order Correction

TABLE 3

| Center correction |  | C3 | C2 | C1 | C0 |
|---|---|---|---|---|---|
| Not corrected | Wide angle end | −2.39E−04 | 3.57E−03 | 8.91E−03 | 1.00E+00 |
|  | 349 mm | −1.04E−03 | 2.09E−02 | −2.74E−02 | 1.00E+00 |
|  | Telephoto end | −2.41E−05 | 4.42E−04 | −3.10E−06 | 1.00E+00 |
| Corrected | Wide angle end | −2.39E−04 | 3.57E−03 | 8.91E−03 | 1.00E+00 |
|  | 349 mm | −1.04E−03 | 2.09E−02 | −2.74E−02 | 1.00E+00 |
|  | Telephoto end | −1.40E−04 | 2.57E−03 | −1.81E−05 | 5.82E+00 |

(B) Fourth-Order Correction

TABLE 4

| Center correction |  | D4 | D3 | D2 | D1 | D0 |
|---|---|---|---|---|---|---|
| Not corrected | Wide angle end | 2.32E−05 | −5.39E−04 | 4.67E−03 | 7.64E−03 | 1.00E+00 |
|  | 349 mm | −4.51E−04 | 3.57E−03 | 6.13E−03 | −1.33E−02 | 1.00E+00 |
|  | Telephoto end | 5.02E−07 | −2.94E−05 | 4.59E−04 | −1.93E−05 | 1.00E+00 |
| Corrected | Wide angle end | 2.32E−05 | −5.39E−04 | 4.67E−03 | 7.64E−03 | 1.00E+00 |
|  | 349 mm | −4.51E−04 | 3.57E−03 | 6.14E−03 | −1.34E−02 | 1.00E+00 |
|  | Telephoto end | 2.92E−06 | −1.71E−04 | 2.67E−03 | −1.12E−04 | 5.82E+00 |

TABLE 5

| | Center correction | Focal length | Conditional Expression (6) $C2 + 6 \times C3$ | Conditional Expression (8) $C3 + 8 \times C4$ |
|---|---|---|---|---|
| Second lens sub-unit is inserted into optical path | Not corrected | Wide angle end | 7.78E−03 | −6.44E−04 |
| | | 349 mm | 3.81E−02 | −3.34E−03 |
| | | Telephoto end | 2.04E−02 | 7.96E−03 |
| | Corrected | Wide angle end | 7.78E−03 | −6.44E−04 |
| | | 349 mm | 3.82E−02 | −3.34E−03 |
| | | Telephoto end | 1.19E−01 | 4.63E−02 |
| Extender lens unit is inserted into optical path | Not corrected | Wide angle end | 2.13E−03 | −3.54E−04 |
| | | 698 mm | 1.46E−02 | −3.79E−05 |
| | | Telephoto end | 2.98E−04 | −2.54E−05 |
| | Corrected | Wide angle end | 2.13E−03 | −3.54E−04 |
| | | 698 mm | 1.47E−02 | −3.79E−05 |
| | | Telephoto end | 1.73E−03 | −1.48E−04 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-169309, filed Sep. 11, 2018, which is hereby incorporated by reference herein in its entirety.

What is claimed is:

1. A lens apparatus having a zooming function and being attachable and detachable to a camera apparatus, the lens apparatus comprising:
a memory storing information for light amount compensation for image data obtained by pickup with the camera apparatus of an image formed by the lens apparatus with respect to each of a plurality of focal lengths of the lens apparatus; and
a communication device configured to transmit the information to the camera apparatus,
wherein the information includes a coefficient of a polynomial having an n-th order with respect to an image height, n being a non-negative integer,
wherein the memory stores the information with respect to each of the plurality of focal lengths such that logarithms of focal lengths satisfying a conditional expression $$0.9 < f/(ft \times Fnw/Fnt) < 4$$

are denser than logarithms of focal lengths not satisfying the conditional expression, where f represents a focal length of the plurality of focal lengths, Fnw represents an effective f-number in a full aperture state and at a wide angle end, Fnt represents an effective f-number in the full aperture state and at a telephoto end, and ft represents a focal length at the telephoto end.

2. The lens apparatus according to claim 1, wherein a conditional expression, $$0.01 < ((F_{n(f+\Delta f)} - F_{nf}) - (F_{nf} - F_{n(f-\Delta f)}))/N_{(f \pm \Delta f)} < 0.2,$$

is satisfied in a range of the focal length fin which a conditional expression $$0.5 < (F_{n(f+\Delta f)} - F_{nf}) - (F_{nf} - F_{n(f-\Delta f)}) < 5.0$$

is satisfied where $\Delta f$ is defined by an expression $$\Delta f = 0.2 \times (ft - fw),$$

where $N_{(f \pm \Delta f)}$ represents a number of focal lengths included in a focal length range not less than $(f-\Delta f)$ and not greater than $(f+\Delta f)$ of the plurality of focal lengths, $F_{nf}$ represents an effective f-number in the full aperture state and at the focal length f, $F_{n(f-\Delta f)}$ represents an effective f-number in the full aperture state and at a focal length $f-\Delta f$, $F_{n(f+\Delta f)}$ represents an effective f-number in the full aperture state and at a focal length $f+\Delta f$, and fw represents a focal length at the wide angle end.

3. The lens apparatus according to claim 1, comprising a zoom lens unit, a focus lens unit, and an aperture stop, wherein the coefficient corresponds to each of a plurality of combinations of a state of the zoom lens unit, a state of the focus lens unit, and a state of the aperture stop.

4. The lens apparatus according to claim 1, wherein the coefficient includes a coefficient C0, a coefficient C1, a coefficient C2, and a coefficient C3 of a third-order polynomial, as the n-th order polynomial, expressed as $$Dc = C3 \times h^3 + C2 \times h^2 + C1 \times h + C0,$$

where h represents the image height, and Dc represents an amount for the light amount compensation.

5. The lens apparatus according to claim 4, wherein a conditional expression $$-0.1 < C2 + 6 \times C3 < 0.3$$

is satisfied.

6. The lens apparatus according to claim 1, wherein the coefficient includes a coefficient C0, a coefficient C1, a coefficient C2, a coefficient C3, and a coefficient C4 of a fourth-order polynomial, as the n-th order polynomial, expressed as $$Dc = C4 \times h^4 + C3 \times h^3 + C2 \times h^2 + C1 \times h + C0,$$

where h represents the image height, and Dc represents an amount for the light amount compensation.

7. The lens apparatus according to claim 6, wherein a conditional expression $$-0.1 < C3 + 8 \times C4 < 0.1$$

is satisfied.

8. The lens apparatus according to claim 1, wherein the lens apparatus has an operation mode in which the communication device transmits only a 0-th order coefficient of the n-th order polynomial to the camera apparatus.

9. The lens apparatus according to claim 1, wherein a conditional expression $$0.7 < C0_{(Z)} \times (Fw/F_{(Z)})^2 < 1.3$$

is satisfied where $C0_{(Z)}$ represents a 0-th order coefficient of the n-th order polynomial at a zoom state Z of the lens apparatus, $F_{(Z)}$ represents an effective f-number in the full aperture state and at the zoom state Z.

10. The lens apparatus according to claim 1, further comprising a first lens unit located closest to an object side, configured not to be moved for zooming, including a focusing subunit, and having a positive refractive power.

11. The lens apparatus according to claim 1, further comprising:
an extender lens unit configured such that insertion thereof to and removal thereof from an optical path is selectively enabled; and
a detector configured to detect a state of the insertion or the removal or both thereof, wherein the coefficient is changed based on the detected state.

12. An image pickup apparatus comprising:

a lens apparatus having a zooming function and being attachable and detachable to a camera apparatus, the lens apparatus comprising:

a memory storing information for light amount compensation for image data obtained by pickup with the camera apparatus of an image formed by the lens apparatus with respect to each of a plurality of focal lengths of the lens apparatus; and a communication device configured to transmit the information to the camera apparatus, wherein the information includes a coefficient of a polynomial having an n-th order with respect to an image height, n being a non-negative integer, wherein the memory stores the information with respect to each of the plurality of focal lengths such that logarithms of focal lengths satisfying a conditional expression $$0.9 < f/(ft \times Fnw/Fnt) < 4$$

are denser than logarithms of focal lengths not satisfying the conditional expression, where f represents a focal length of the plurality of focal lengths, Fnw represents an effective f-number in a full aperture state and at a wide angle end, Fnt represents an effective f-number in the full aperture state and at a telephoto end, and ft represents a focal length at the telephoto end; and the camera apparatus comprising an image pickup element that receives an image formed by the lens apparatus.

13. A processing apparatus which receives the information from the lens apparatus of claim 1, and executes processing for the light amount compensation of the image data, obtained by pickup with the camera apparatus of the image formed by the lens apparatus, based on the information.

14. A camera apparatus comprising the processing apparatus of claim 13.

15. The lens apparatus according to claim 1, wherein the memory stores the information with respect to each of the plurality of focal lengths such that logarithms of focal lengths satisfying a conditional expression $$0.95 < f/(ft \times Fnw/Fnt) \leq 1.7$$

are denser than logarithms of focal lengths not satisfying the conditional expression.

* * * * *